United States Patent
Kagawa et al.

(10) Patent No.: US 6,423,385 B1
(45) Date of Patent: Jul. 23, 2002

(54) LIQUID CRYSTAL DISPLAY DEVICES

(75) Inventors: Hiroyuki Kagawa; Shintaro Takeda, both of Hitachi; Kotaro Araya; Sukekazu Aratani, both of Hitachioota; Katsumi Kondo, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/512,475

(22) Filed: Feb. 24, 2000

(30) Foreign Application Priority Data

Feb. 25, 1999 (JP) ............................................ 11-048594

(51) Int. Cl.⁷ ........................ C09K 19/02; G02F 1/1343; G02F 1/1333
(52) U.S. Cl. ..................... 428/1.1; 252/299.01; 349/84; 349/155; 349/167
(58) Field of Search ........................ 252/299.01, 299.5; 428/1.1; 349/84, 155, 167

(56) References Cited

U.S. PATENT DOCUMENTS 5,048,933 A  *  9/1991  Asano .......................... 349/61

FOREIGN PATENT DOCUMENTS

| JP | 63-21907 | 5/1988 |
|---|---|---|
| JP | 5-053121 | 8/1991 |
| JP | 5-173147 | 11/1991 |
| JP | 6-250194 | 2/1993 |
| JP | 5-505247 | 8/1993 |
| JP | 7-325298 | 5/1994 |
| JP | 8-160433 | 12/1994 |
| JP | 7-306417 | 2/1995 |
| JP | 8-292426 | 4/1995 |
| JP | 09-061823 | 8/1995 |
| JP | 10-170928 | 12/1996 |
| JP | 9-125063 | 5/1997 |
| JP | 10-067988 | 6/1997 |
| JP | 9-255956 | 9/1997 |

OTHER PUBLICATIONS

D. Klement et al., SID International Symposium, "Digest of Technical Papers", 1998, 26.2.
Masahito Oh–e et al., Applied Physics Letters, "Electro–Optical Characteristics and Switching Behavior of the In–Plane Switching Mode", vol. 67, pp. 3895–3897, 1995.
Masahito Oh–e et al., Applied Physics Letters, "Response Mechanism of Nematic Liquid Crystals Using the In–Plane Switching Mode", vol. 69, pp. 623–625, 1996.
Tanaka et al., IDW '97 Proceedings of the Fourth International Display Workshops, Nov. 19–21, 1997, Nagoya Congress Center, Nagoya, Japan.

* cited by examiner

*Primary Examiner*—Shean C. Wu
(74) *Attorney, Agent, or Firm*—Antonelli, Terry, Stout & Kraus, LLP

(57) ABSTRACT

Realizing low driving voltage, high contrast, and high response speed in an active matrix type liquid crystal display device of the in-plane switching mode type. The construction of the liquid crystal display device according to the present invention comprises a pair of substrates whose spacing is determined by spacers placed in a non-displaying region, a liquid crystal layer filled in the space between said pair of substrates, a set of electrodes formed on the surface of one of the substrates of said pair of substrates for applying an electric field to said liquid crystal layer, and a pair of optical polarizers placed so that they enclose said liquid crystal layer and with their axes of polarization almost at right angles to each other, with the liquid crystal layer containing 40% or more weight percentage or 100% or less weight percentage of a constituent component with a dielectric anisotropy of $\Delta\varepsilon \leq 1$, the directions of controlled orientation of liquid crystal molecules at the two surfaces between said liquid crystal layer and said pair of substrates being almost parallel, and with the axis of polarization of one of the polarizers being almost aligned with the direction of controlled orientation of liquid crystal molecules at said surfaces.

25 Claims, 14 Drawing Sheets

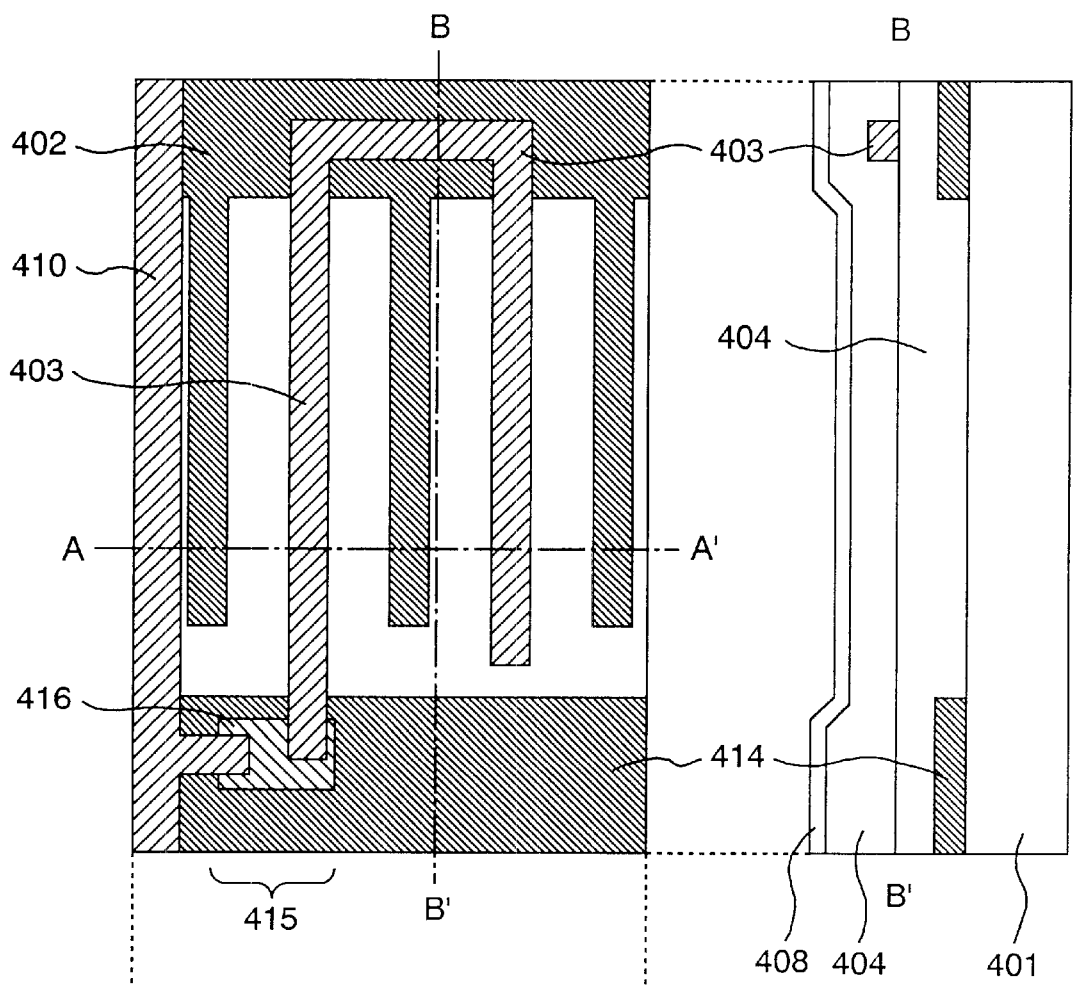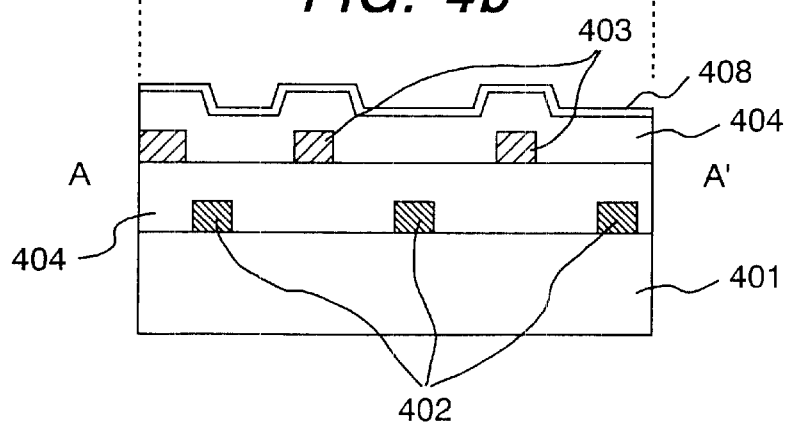

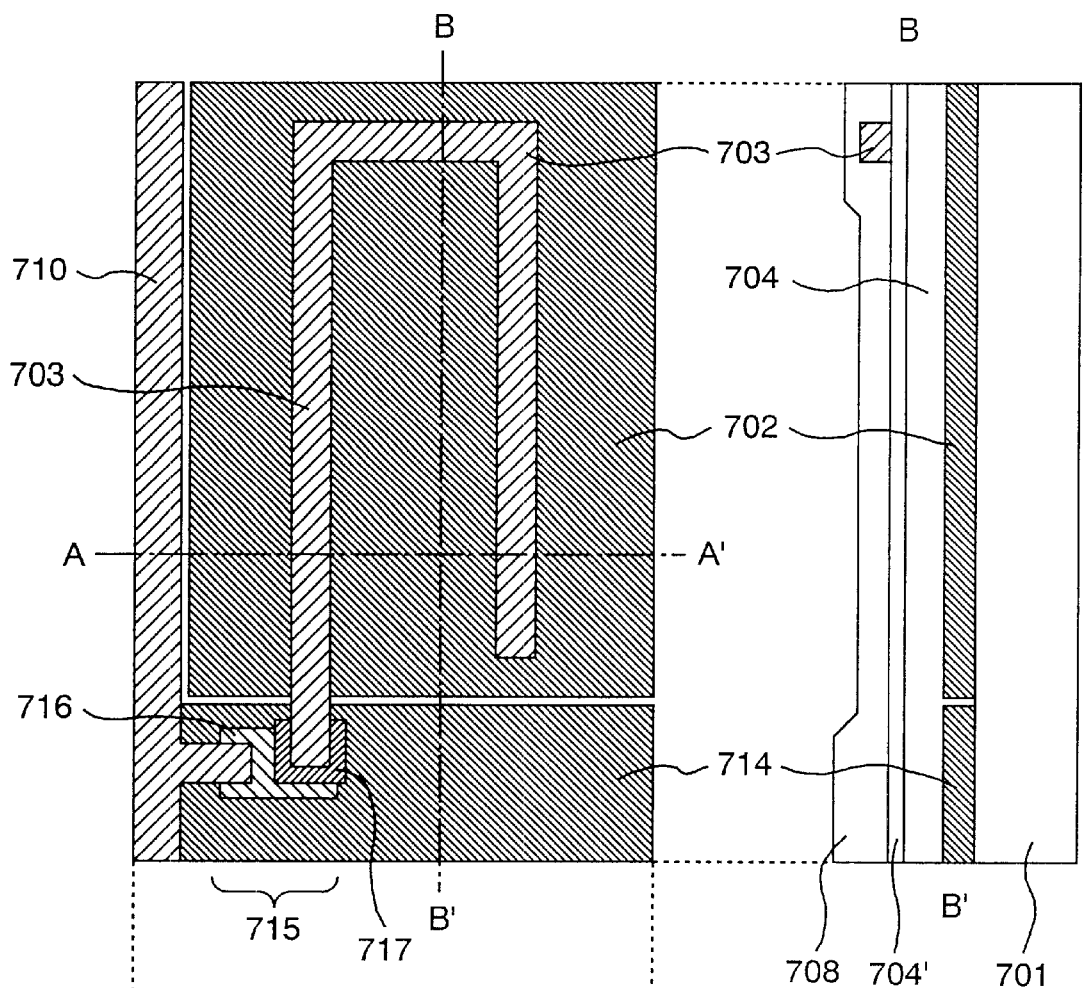
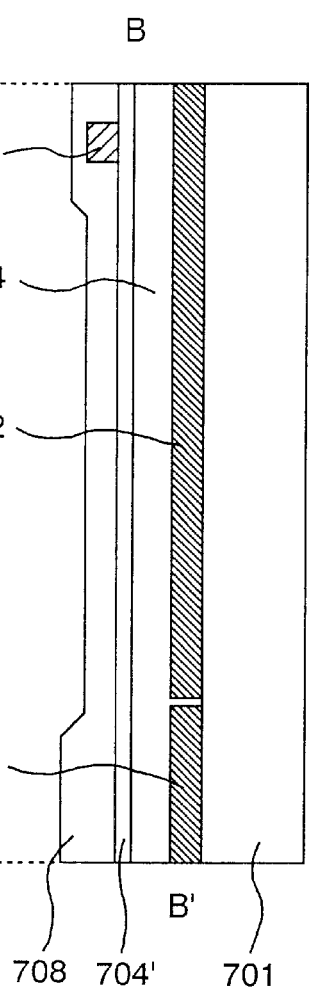
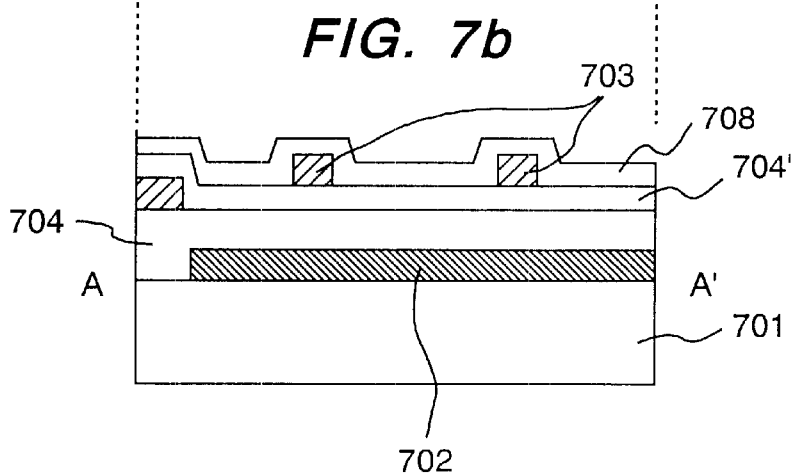
FIG. 7a
FIG. 7c
FIG. 7b

FIG. 11
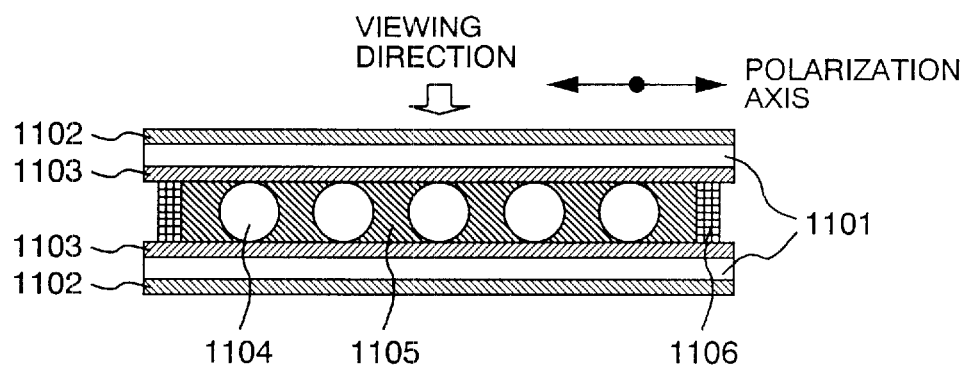
FIG. 12a     FIG. 12b     FIG. 12c
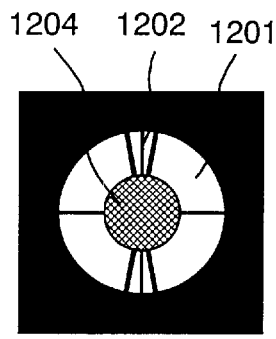
CONTENT OF
CONSTITUENT
COMPONENT
WITH $\triangle \varepsilon \leqq 1 = 50\%$
BY WEIGHT
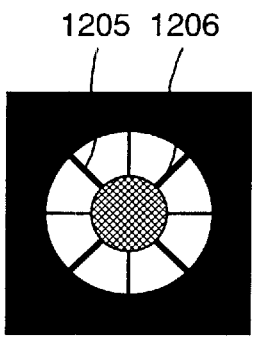
CONTENT OF
CONSTITUENT
COMPONENT
WITH $\triangle \varepsilon \leqq 1 = 45\%$
BY WEIGHT
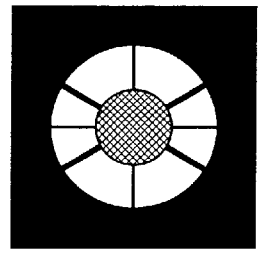
CONTENT OF
CONSTITUENT
COMPONENT
WITH $\triangle \varepsilon \leqq 1 = 40\%$
BY WEIGHT
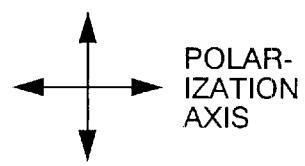
POLAR-
IZATION
AXIS
RUBBING
DIRECTION

*FIG. 13a*  *FIG. 13b*  *FIG. 13c*
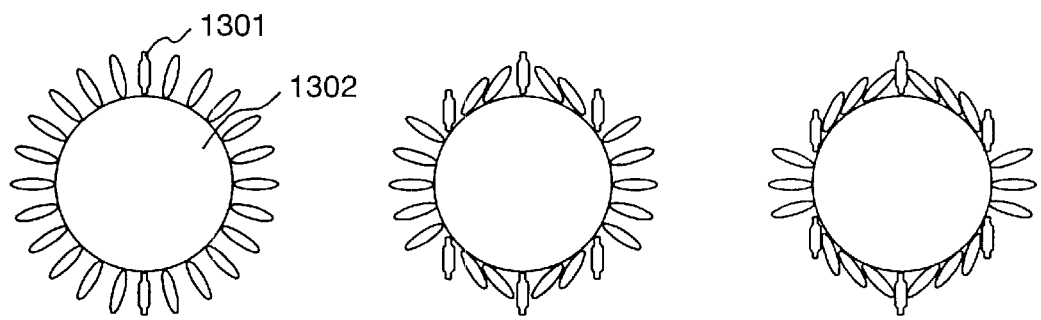
*FIG. 14*
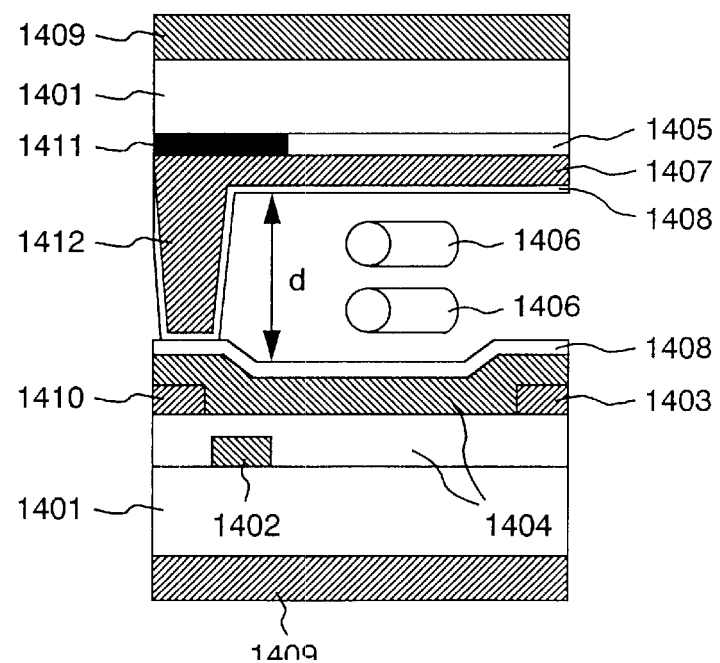

LIQUID CRYSTAL DISPLAY DEVICES

BACKGROUND OF THE INVENTION

The present invention is related to liquid crystal display devices, and, in particular to active matrix liquid crystal display devices.

A liquid crystal display device changes the direction of orientation of liquid crystals by applying an electric field to a layer of liquid crystals held in between two substrates, and carries out display using the changes in the optical characteristics of the liquid crystal layer resulting from such changes in the direction of orientation of the crystals. In a conventional active matrix type liquid crystal display, as is typified by the twisted nematic (TN) display mode in which the display is made utilizing the optical rotation characteristics of liquid crystals, the orientation of the electric field applied to the liquid crystal was set to be almost perpendicular to the substrate boundary surface. On the other hand, the method of carrying out display using the birefringence characteristics of liquid crystals (the in-plane switching mode) by making the orientation of the electric field applied using comb-tooth shaped electrodes to the liquid crystal almost parallel to the substrate, has been proposed, for example, in Japanese Patent Publication No. Sho 63-21907, and Japanese Unexamined Patent Publication No. Hei 5-505247. This in-plane switching mode has the advantage of wider viewing angles compared to the conventional TN mode and is a very promising technology for active matrix type liquid crystal display devices.

As liquid crystal materials for active matrix type liquid crystal display devices of the in-plane switching mode, it has been proposed to use liquid crystal mixtures having relatively low specific resistances (Japanese Unexamined Patent Publication No. Hei 7-306417), liquid crystal mixtures containing 4-(cyclohexylcarbonyloxy)-benzonitrile in order to achieve both low driving voltage and high response speed (Japanese Unexamined Patent Publication No. Hei 9-125063), liquid crystal mixtures containing chemical compounds having fluorine as a polar group (Japanese Unexamined Patent Publication Nos. Hei 9-85541 and Hei 9-181823), or liquid crystal materials containing constituents with cyano group (D. Klement et al, SID International Symposium 98, 26.3), etc.

Further, in this in-plane switching mode, the relationships given by the following equations [Eqn. 1] and [Eqn. 2] are known to exist between the driving voltage, the liquid crystal response time, and the physical properties of the liquid crystal material (Masahito Oh-e and Katsumi Kondo, Applied Physics Letters, Vol. 67, pp. 3895–3897, 1995; Masahito Oh-e and Katsumi Kondo, Applied Physics Letters, Vol. 69, pp. 623–625, 1996).

$$\tau \text{off } \gamma 1 \times d^2 / K22 \qquad \text{[Eqn. 1]}$$

$$Vth\ (L \times \sqrt{(K22/\Delta \in)})/d \qquad \text{[Eqn. 2]}$$

Here, $V_{th}$ is the threshold voltage of the liquid crystal, $K_{22}$ is the twist elastic constant of the liquid crystal material, $\Delta \in$ is the dielectric anisotropy, L is the electrode spacing (see FIG. 1), d is the thickness of the liquid crystal layer (see FIG. 1) $\tau_{off}$ is the response time of the liquid crystals from the voltage applied condition to the no-voltage condition, and $\gamma 1$ is the rotational viscosity of the liquid crystals.

Further, it is possible to transform [Eqn. 1] and [Eqn. 2] respectively into [Eqn. 3] and [Eqn. 4] because $d \times \Delta n$ is almost constant in order to maintain the optical characteristics.

$$\tau \text{off } \gamma 1 / (K22 \times \Delta n^2) \qquad \text{[Eqn. 3]}$$

$$Vth\ L \times \Delta n \times \sqrt{(K22/\Delta \in)} \qquad \text{[Eqn. 4]}$$

As can be seen from these equations, the response time $\tau_{off}$ becomes shorter as the viscosity of the liquid crystal $\gamma 1$ becomes lower, and the driving voltage becomes lower as the dielectric anisotropy $\Delta \in$ becomes larger. However, in the case of most liquid crystal materials, there is an almost proportional relationship between the viscosity and the dielectric anisotropy $\Delta \in$, that is, there is a trend that the viscosity is lower in liquid crystals with smaller $\Delta \in$ and the viscosity becomes higher as $\Delta \in$ becomes larger. This is because there is a trend that the dipole moments of high polar liquid crystal molecules which make $\Delta \in$ of mixtures large are large, and the intermolecular interaction between molecules is large in materials with large dipole moment, and consequently, the viscosity of the entire liquid crystal becomes large. Therefore, in the in-plane switching mode of display, there is a trade-off between the high-speed response characteristics of liquid crystals and low driving voltage. In other words, if a large amount of low polarity component with $\Delta \in \leq 1$ and relatively low viscosity, that is, a so called neutral component, is added, although the viscosity gets reduced and a fast response can be achieved, the driving voltage also increases at the same time. Further, if a large amount of high polar component with large $\Delta \in$ is added, although the driving voltage can be reduced, the viscosity increases thereby making the response of the liquid crystal slower. Furthermore, not much has so far been proposed about the method of controlling the twist elastic constant $K_{22}$ which is one additional parameter affecting the driving voltage and the response time.

On the other hand, in order to achieve high contrast, a number of technologies have been developed for placing the spacers to keep the spacing between the pair of substrates constant in a non-displaying region of the display device. For example, such methods have been proposed as described in Japanese Unexamined Patent Publication No. Hei 10-170928, Japanese Unexamined Patent Publication No. Hei 9-61828, Japanese Unexamined Patent Publication No. Hei 6-250194, Japanese Unexamined Patent Publication No. Hei 5-53121, Japanese Unexamined Patent Publication No. Hei 5-173147, Japanese Unexamined Patent Publication No. Hei 8-160433, Japanese Unexamined Patent Publication No. Hei 8-292426, and Japanese Unexamined Patent Publication No. Hei 7-325298, etc.

SUMMARY OF THE INVENTION

As has been described above, in the liquid crystal materials for active matrix type liquid crystal display devices using the in-plane switching mode, there is a trade-off relationship between the response time and the driving voltage of the liquid crystals, that is, the driving voltage increases if the response time is decreased by reducing the viscosity of the liquid crystals by increasing the neutral liquid crystal component and the response time decreases if the dielectric anisotropy $\Delta \in$ is made large, and hence there was the problem that it was difficult to achieve both lower viscosity and higher $\Delta \in$ of the liquid crystal material, that is, to achieve both high-speed response and low driving voltage. In addition, so far the method of controlling the twist elastic constant $K_{22}$ of the liquid crystals was not clear.

Further, from the results of experiments, it was found that there is a trade-off relationship between high response speed and high contrast in the in-plane switching mode active matrix type liquid crystal display devices. It was also found that when the content of the neutral component in the liquid crystal layer was increased thereby attempting to obtain a high response speed due to reduced viscosity, there was a reduction in the contrast, and it is because the brightness at the black state increased. In active matrix type liquid crystal display devices using the in-plane switching mode, normally, polarizers placed so that the polarization axes are approximately at right angles are used as the optical means for changing the optical characteristics in accordance with the molecular orientation of the liquid crystal layer. In this case, the transmittance increases as the voltage applied to the liquid crystal layer is increased, that is, the normally closed mode is used. In the case of this normally closed display mode, the orientation of the liquid crystal molecules around the spacers for keeping the spacing between the substrates constant differs from the direction of controlled orientation of the liquid crystal molecules near the substrate, and hence light leaks around the spacers at the black state thereby increasing the black brightness and consequently reducing the contrast. From the results of further investigations, it was found that, as the content of the neutral component in the liquid crystal layer is increased, this light leak around the spacers increases, the brightness at the black state increases, and as a result, the contrast decreases.

In view of the above problems in the conventional technology, the first objective of the present invention is to provide an active matrix type liquid crystal display device using the in-plane switching mode in which both high response speed and high contrast are achieved. The second objective of the present invention is to provide an active matrix type liquid crystal display device using the in-plane switching mode in which both high response speed and high contrast are achieved, while also achieving a low driving voltage.

In order to achieve the first objective mentioned above, the liquid crystal display device according to the present invention is a liquid crystal display device having a pair of substrates whose spacing is determined by spacers, a liquid crystal layer filled in the space between said pair of substrates, a set of electrodes formed on the surface of one of the substrates of said pair of substrates for applying an electric field to said liquid crystal layer, and a pair of optical polarizers with mutually perpendicular axes of polarization placed so that they enclose said liquid crystal layer, with said liquid crystal display device having the characteristic that, said spacers are in a non-displaying area, said liquid crystal layer contains 40% or more weight percentage but 100% or less weight percentage of a constituent component with a dielectric anisotropy of $\Delta\epsilon \leq 1$, and the directions of controlled orientation of liquid crystal molecules at the two surfaces between said liquid crystal layer and said pair of substrates are almost parallel to each other, and the polarization axis of one of the polarizers is almost the same as the direction of controlled orientation of liquid crystal molecules at said surface.

In addition, in order to achieve said objective, the liquid crystal display device according to the present invention has a pair of substrates whose spacing is kept constant by spacers, a liquid crystal layer filled in the space between said pair of substrates, a set of electrodes formed on the surface of one of the substrates of said pair of substrates for applying an electric field to said liquid crystal layer, and a pair of optical polarizers with mutually perpendicular axes of polarization placed so that they enclose said liquid crystal layer, with said liquid crystal display device having the characteristic that, the rotational viscosity coefficient $\gamma 1$ and the birefringence $\Delta n$ of said liquid crystal layer satisfy the condition of $1 \times 10^3$ mPa·s $\leq \gamma 1/\Delta n^2 \leq 1.2 \times 10^4$ mPa·s.

Further, in the liquid crystal display device having a pair of substrates whose spacing is kept constant by spacers, a liquid crystal layer filled in the space between said pair of substrates, a set of electrodes formed on the surface of one of the substrates of said pair of substrates for applying an electric field to said liquid crystal layer, and a pair of optical polarizers with mutually perpendicular axes of polarization placed so that they enclose said liquid crystal layer, said liquid crystal display device has the characteristic that, said spacers are in a non-displaying area, said liquid crystal layer contains 40% or more weight percentage but 100% or less weight percentage of a constituent component with a dielectric anisotropy of $\Delta\epsilon \leq 1$, the rotational viscosity coefficient $\gamma 1$ and the birefringence $\Delta n$ of said liquid crystal layer satisfy the condition of $1 \times 10^3$ mPa·s $\leq \gamma 1/\Delta n^2 \leq 1.2 \times 10^4$ mPa·s, the directions of controlled orientation of liquid crystal molecules at the two surfaces between said liquid crystal layer and said pair of substrates are almost parallel to each other, and the polarization axis of one of the polarizers is almost the same as the direction of controlled orientation of liquid crystal molecules at said surface.

It is preferable that the content of said neutral component is 40% or more weight percentage but 90% or less weight percentage.

Further, it is preferable that the rotational viscosity coefficient $\gamma 1$ and the birefringence $\Delta n$ of said liquid crystal layer satisfy the condition of $1 \times 10^3$ mPa·s $\leq \gamma 1/\Delta n^2 \leq 6 \times 10^3$ mPa·s.

In addition, the set of electrodes of this liquid crystal display device is a set consisting of pixel electrodes, common electrodes, and active devices.

In addition, the active devices in this liquid crystal display device are thin-film transistors.

Further, the at least either one of the pixel electrodes and the common electrodes of this liquid crystal display device are formed as transparent electrodes.

In this liquid crystal display device, the birefringence $\Delta n$ and the thickness d of said liquid crystal layer satisfy the condition of $0.2$ μm $< d \cdot \Delta n < 0.4$ μm.

Further, the spacers in this liquid crystal display device are structural components formed on one of the substrates.

At least one of the constituent components with a dielectric anisotropy of $\Delta\epsilon \leq 1$ contained in said liquid crystal layer can be a chemical compound having two ring structures in the molecule, and said ring structure is a combination of a benzene ring and a cyclohexane ring. Or else, at least one of the constituent components with a dielectric anisotropy of $\Delta\epsilon \leq 1$ contained in said liquid crystal layer can be a chemical compound having only one ring structure in the molecule, and said ring structure is either a benzene ring or a cyclohexane ring.

In order to achieve said second objective, the liquid crystal display device according to the present invention has the characteristic that its liquid crystal layer contains a chemical compound having the structure indicated by the following chemical formula in the molecule.

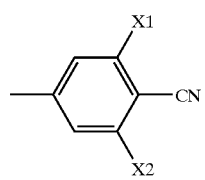

(X1 and X2 in this chemical formula denote H or F.)

Further, there is the characteristic that the liquid crystal layer contains an medium polar component between a low polar component with a dielectric anisotropy of $\Delta\epsilon \leq 1$ and the high polar component expressed by above chemical formula. The liquid crystal component with medium polar can also be a liquid crystal component with a structure selected from the set expressed by the following formula.

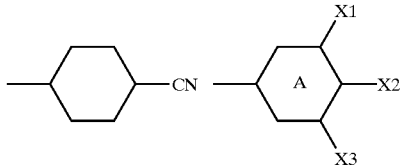

(X1 and X2 in this chemical formula denote H or F. A denotes either a benzene ring or a cyclohexane ring.)

Further, the spacing L between the pixel electrodes and the common electrodes, the birefringence $\Delta n$ of said liquid crystal layer, and the dielectric anisotropy $\Delta\epsilon$ satisfy the condition of $L\Delta n/\sqrt{\Delta\epsilon} \leq 0.55$ $\mu$m. In addition, it is preferable that the condition $L\Delta n/\sqrt{\Delta\epsilon} \leq 0.4$ $\mu$m is satisfied.

Further, at least either one of the pixel electrodes and the common electrodes are made of a transparent material, and the birefringence $\Delta n$ and the dielectric anisotropy $\Delta\epsilon$ satisfy the condition of $\Delta n/\sqrt{\Delta\epsilon} \leq 5.5 \times 10^{-2}$.

In addition, in the liquid crystal display device according to the present invention, the liquid crystal layer has a dielectric anisotropy of 7 or more and a twist elastic constant $K_{22}$ of 5.5 pN or less.

In addition, the liquid crystal display device according to the present invention has the characteristic that the response time between the lowest brightness level and the highest brightness level is less than or equal to one frame period. Also, it is preferable that the response time between gray levels is less than or equal to one frame period.

DETAILED DESCRIPTION OF THE DRAWINGS

FIG. 4 is a schematic diagram of one pixel part of the liquid crystal display device according to the present invention showing the plan view and the cross-sectional view of the placement of the set of electrodes, insulating layers, and alignment layer.

FIG. 7 is a schematic diagram of one pixel part of the liquid crystal display device according to the present invention showing the plan view and the cross-sectional view of the placement of the set of electrodes, insulating layers, and alignment layer.

FIG. 11 is a schematic cross-sectional diagram of the measurement cell for the observation of the liquid crystal orientation around the spacers.

FIG. 12 is a schematic diagram showing the amount of constituent component with $\Delta\epsilon \leq 1$ in the liquid crystal layer and the light leakage around the spacers in a liquid crystal display device according to the present invention.

FIG. 13 is a schematic diagram showing the estimated condition of liquid crystal orientation around the spacers.

FIG. 14 is a schematic cross-sectional diagram of a pixel section of a liquid crystal display device using pillar-shaped spacers in a preferred embodiment of the present invention.

DESCRIPTION OF THE PREFERRED EMBODIMENT

Firstly, the principle of operation of liquid crystals in a liquid crystal display device using the in-plane switching mode type which is being proposed in the present invention is described below using the schematic diagram of FIG. 1. FIG. 1 shows the operation of liquid crystals in a liquid crystal panel of the in-plane switching mode type, and the parts (a) and (b) of the figure show the cross-sectional view, and the parts (c) and (d) show the plan view. Further, while stripe-shaped electrodes are formed in the entire display in the form of a matrix to configure a number of pixels, only the part of one pixel has been shown in FIG. 1 for the sake of simplicity. FIG. 2 shows the definitions of the angle $\Phi p$ between the direction of the transmittance axis 202 of the polarizer with the direction of the electric field 203 (113 in FIG. 2) and the angle $\Phi_{LC}$ of the direction of orientation 201 (111 in FIG. 1) of the longitudinal axis (optical axis) of the liquid crystal molecules in the vicinity of the interface with the substrate.

Figure 1A:
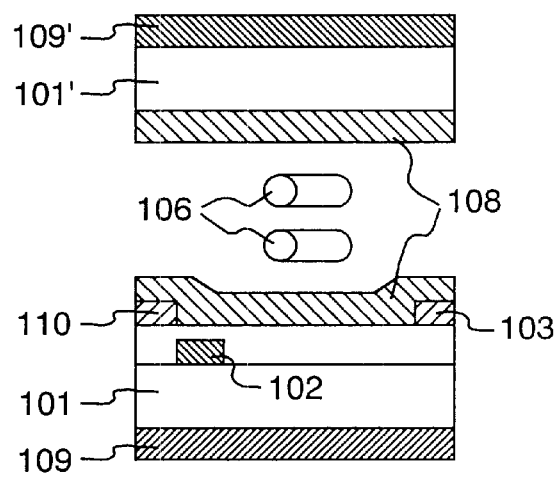
FIG. 1 is a schematic diagram showing the principle of operation of liquid crystals in a liquid crystal display device using the in-plane switching mode according to the present invention.
Figure 1B:
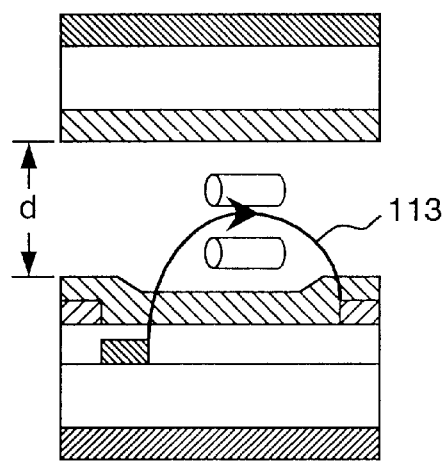
Figure 1C:
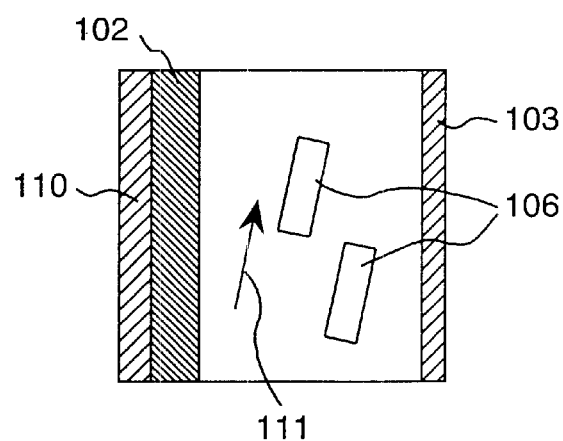
Figure 1D:
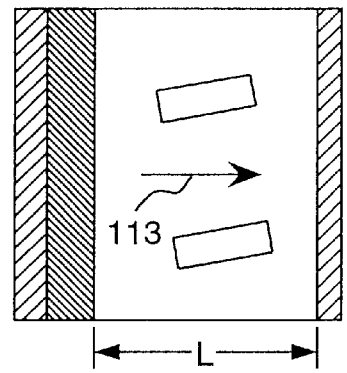
Figure 2:
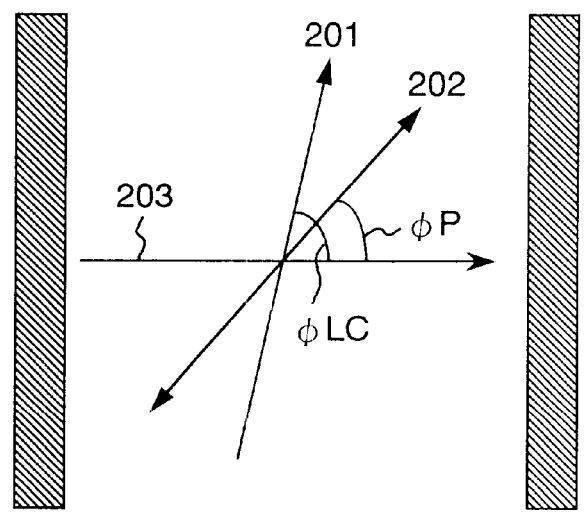
FIG. 2 is a diagram showing the angles subtended respectively by the liquid crystal molecule longitudinal axis orientation direction and the polarized light transmission axis of the polarizers with the electric field direction of the liquid crystal display device according to the present invention.

The condition of the liquid crystal when no voltage has been applied is shown in FIG. 1(a) and the plan view at that time is shown in FIG. 1(c). Stripe-shaped electrodes 102 and 103 are formed on the inside of a pair of transparent substrates 101 and 101', and the alignment layer 108 is formed on top of them. Further, the liquid crystal mixture is held between the two substrates. The rod shaped liquid crystal molecules 106 are oriented in the orientation direction 111 indicated by the arrow mark 201 in FIG. 2 by the alignment layer 108 so that $45°\leq|\Phi_{LC}|<90°$ when no electric field has been applied. Further, the dielectric anisotropy of the liquid crystals is assumed to be positive. The fact that $\Phi_{LC}$ is not equal to 90° is that the direction of movement of the liquid crystal molecules is restricted to one direction with respect to the electric field. In other words, in FIG. 1, the setting has been made so that the liquid crystal molecules 106 always move in the direction from the common electrode 102 towards the pixel electrode 103 relative to the direction of the electric field 113. If $\Phi_{LC}$ is allowed to be equal to 90°, the liquid crystal molecules 106 in the above figure can move in both clockwise and counter-clockwise directions thereby generating domains and consequently causing display defects.

Next, as is shown in FIGS. 1(*b*) and (*d*), when the electric field 113 is applied between the electrodes 102 and 103, the liquid crystal molecules 106 change their orientation in the clockwise direction. At this time, the birefringence of the liquid crystal layer and the effect of the polarizers 109 and 109' cause a change in the optical characteristics of the liquid crystal device, and the images are displayed due to this change.

Figure 3:
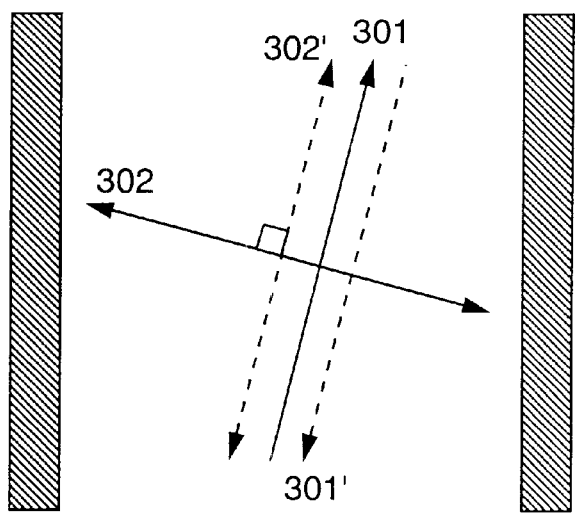
FIG. 3 is a figure showing the relationship between the liquid crystal molecule orientation direction and the polarized light transmission axis of the polarizers of the liquid crystal display device according to the present invention.
Figure 5A:
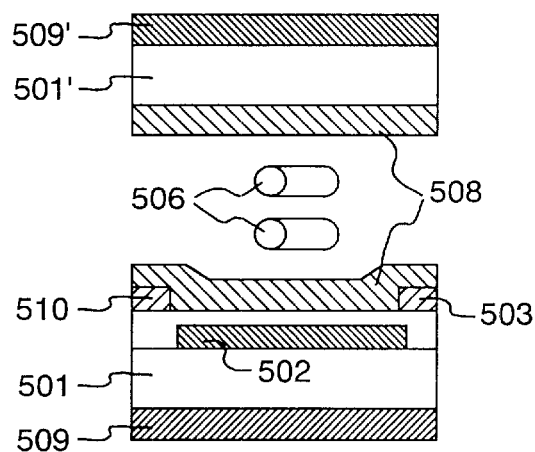
FIG. 5 is a schematic diagram showing the principle of operation of liquid crystals in the liquid crystal display device according to the present invention.
Figure 5B:
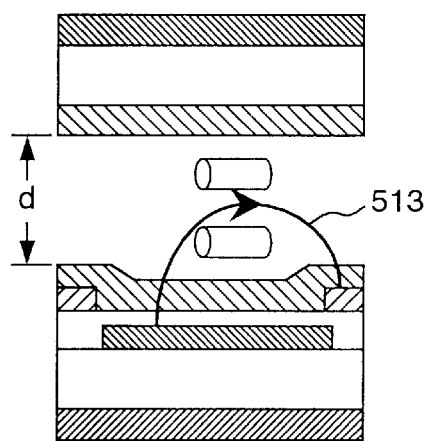
Figure 5C:
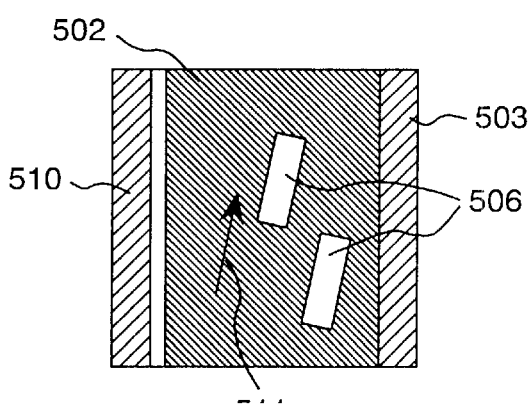
Figure 5D:
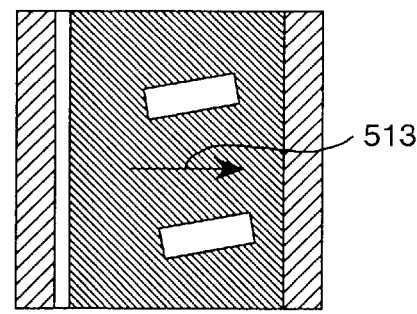

In the liquid crystal display device according to the present invention, the liquid crystal display device is of the in-plane switching mode type with a pair of polarizers, and has the characteristic that the polarization axes of the pair of polarizers are almost at right angles to each other, and the controlled orientation directions of liquid crystal molecules at the two interfaces between the liquid crystal layer and the pair of substrates are almost parallel to each other, and the axis of polarization of one of the polarizers almost matches with the controlled orientation direction. This arrangement is shown in FIG. 3. When this kind of arrangement is used, black can be displayed at low voltages and white can be displayed at high voltages, that is, the brightness increases with increasing driving voltage, in other words, the device becomes a normally closed display device. By using this arrangement, it is possible to make the black state darker, and thus to obtain a liquid crystal display device that has a high contrast. On the other hand, when the axes of the pair of polarizers and the controlled orientation direction of the liquid crystal molecules are all parallel to each other, although display is possible, the brightness at the black state becomes higher and hence the contrast becomes lower.

Further, while the above description has been made when the dielectric anisotropy of the liquid crystals 106 in FIG. 1 is positive, it can also be negative without changing the effects described above. In that case, it is sufficient to orient the initial orientation condition so that $0°\leq|\Phi_{LC}|<45°$ relative to the vertical direction of the stripe-shaped electrodes.

FIG. 4 is a drawing showing the plan view of the structure of the different types of electrodes and their cross-sectional view for a single pixel of a liquid crystal display device according to the first preferred embodiment of the present invention. The device comprises a glass substrate 401 on which the common electrode 402 and the scanning signal electrode 414 are formed, the insulating layer 404 is formed on top of these electrodes, the thin film of amorphous silicon layer 416 is formed on top of this insulating layer, and the video signal electrode 410 and the pixel electrode 403 are formed on top of them to form the thin film transistor 415 (TFT) which is the active device in this display device, and finally another insulating layer 404 if formed on top of these. Although it is possible to use thin film diodes as an alternative active device, it is preferable to use TFTs because they have superior operating characteristics as a switching device.

Figures 6A, 6C:
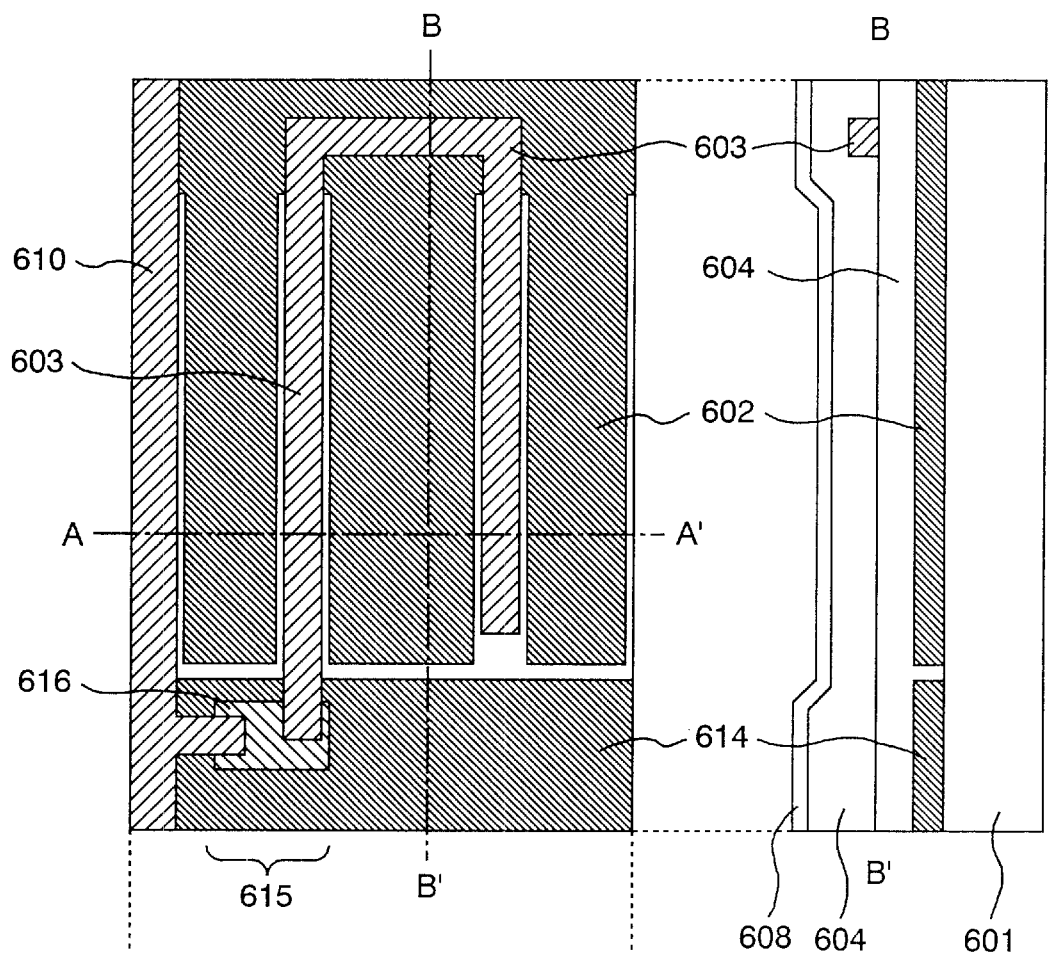
FIG. 6 is a schematic diagram of one pixel part of the liquid crystal display device according to the present invention showing the plan view and the cross-sectional view of the placement of the set of electrodes, insulating layers, and alignment layer.
Figure 6B:
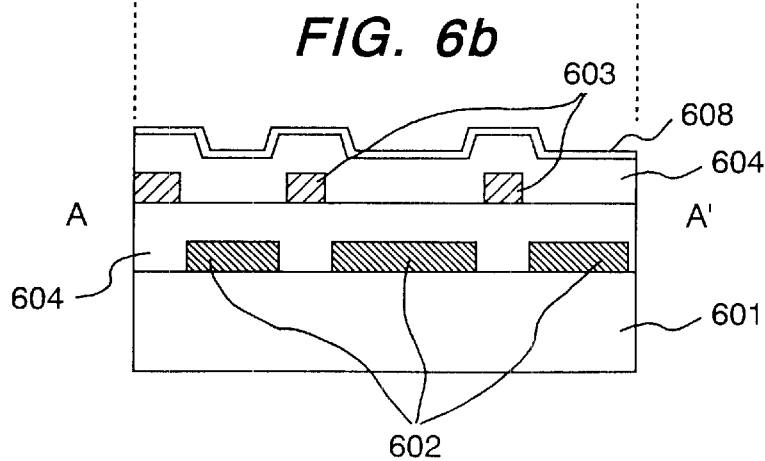

Further, when the common electrode or the pixel electrode is made of a transparent material, as is shown in FIG. 5 to FIG. 7, the reduction in brightness is small even when the electrode is made wide. In FIG. 5, (a) and (b) show the cross-sectional view, while (c) and (d) show the plan view. Similar to FIG. 1 and FIG. 2, the liquid crystal orientation direction is along the transmittance axis of the polarizers, and the liquid crystal molecules 506 change their orientation due to the electric field, and the display is made by the change in the optical characteristics. FIG. 6 and FIG. 7 represent the second and third preferred embodiments of the present invention, and show the plan view structure and the cross-sectional diagram of the different electrodes for one pixel part of the liquid crystal display device. The points of difference with the structure shown in FIG. 3 is that the common electrode and the pixel electrode are transparent electrodes that transmit visible light, and is made, for example, of Indium-Tin-Oxide (ITO).

In the liquid crystal display device according to the present invention, the liquid crystal layer contains 40% or more weight percentage but 100% or less weight percentage of a constituent component with a dielectric anisotropy of $\Delta\epsilon\leq 1$. This is because, the first objective of fast response is being achieved by making the content of the neutral component large thereby lowering the viscosity of the liquid crystal layer. A neutral component can basically lower the viscosity of the liquid crystal layer. This is because, the constituent component with $\Delta\epsilon\leq 1$ has a small dipole moment and hence the intermolecular interaction is small. For example, while the dipole moments of 4-methyl-(4-cyanophenyl)cyclohexane and 4-methyl-(4-cyano-3,5-difluorophenyl)cyclohexane, which are chemical compounds with large dielectric anisotropy, as calculated using the molecular orbital calculation software MOPAC93 (AM1) are 3.93 debyes and 5.43 debyes, respectively, the dipole moments are extremely small for the materials with $\Delta\epsilon\leq 1$, such as 4-methylcyclohexane and 4-methylbenzene, being 0.035 debyes and 0.027 debyes, respectively. In other words, from this calculation, it is evident that the chemical compounds with $\Delta\epsilon\leq 1$ have a small dipole moment and consequently have small intermolecular interactions, and hence it is possible to explain that this makes it possible to lower the viscosity.

Figure 8:
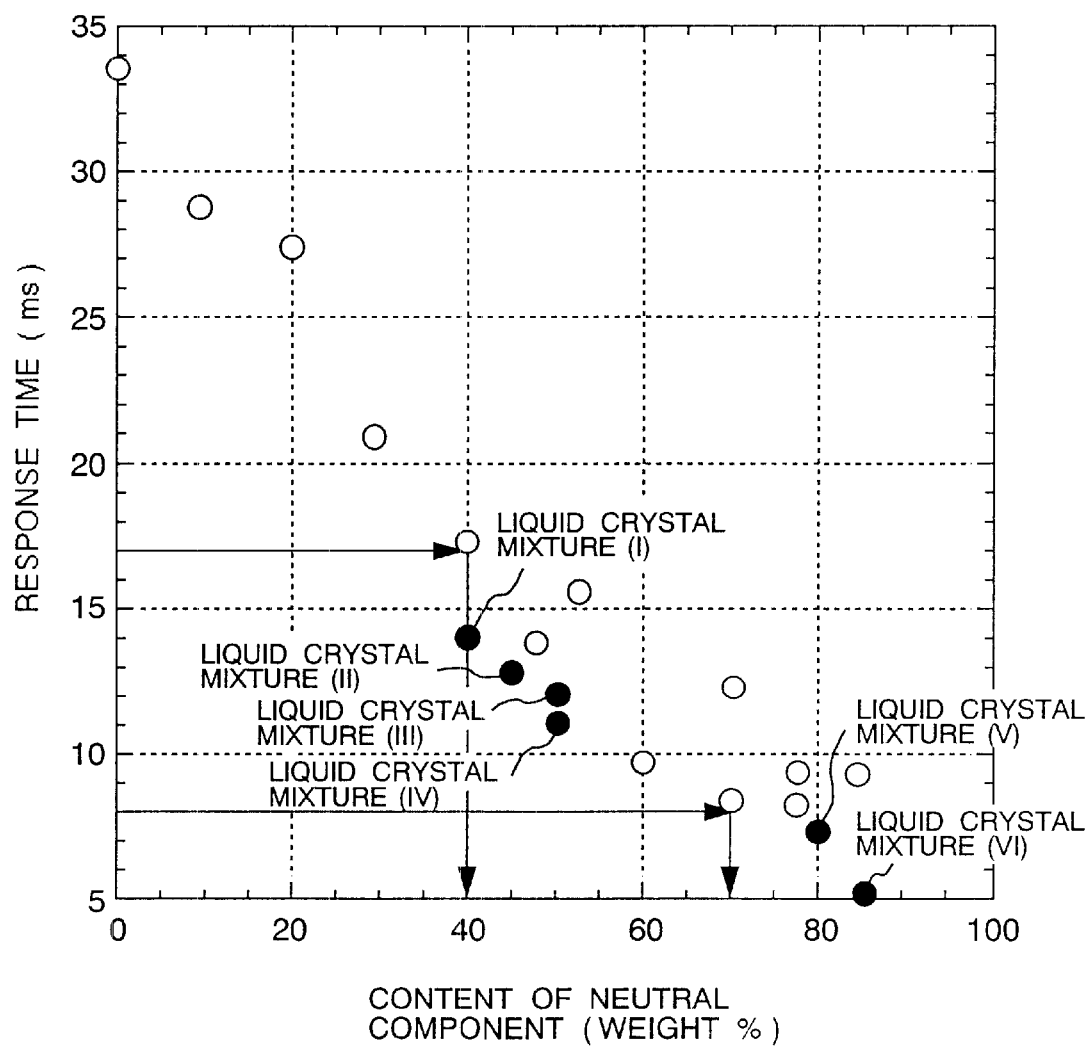
FIG. 8 is a graph showing the relationship between the content of the neutral component in the liquid crystal layer and the response time in the liquid crystal display device using in-plane switching mode according to the present invention.

Next, the response time is described below. In a liquid crystal display device according to the present invention, various displays are made by adjusting the brightness by controlling the condition of orientation of the liquid crystals based on the applied voltage. The response time is the time taken when the voltage is changed from one voltage to another voltage until the brightness reaches the desired value. Since the display is changed at every one-frame period, the required brightness will not be obatained if the response of the liquid crystal is not complete at least within one frame period. In particular, when displaying moving images, the image appears blurred because of the delay in the response of the liquid crystals. Here, the one-frame period is 1/60 seconds=about 17 msec, when the scanning frequency of the scanning circuit is 60 Hz. FIG. 8 shows the relationship between content of the neutral component and the response time of the liquid crystal display device according to the present invention, as obtained from the results of experiments. In the liquid crystal display device according to the present invention, it was found that when the content of the neutral component is 40% or more by weight, the response time becomes smaller than one frame period of about 17 msec when the frame frequency is 60 Hz. Therefore, in the liquid crystal display device according to the present invention, we decided to make the content of the neutral component 40% or more by weight. However, if the amount of neutral component is 100% by weight, $\Delta\in$ becomes 0, and it will not be possible to drive the liquid crystal by electric field. Therefore, in order to drive the liquid crystal, it is necessary that the amount of neutral component is less than 100%, and it is preferable that the content of the neutral component for practical use is 90% or less by weight.

Figure 9:
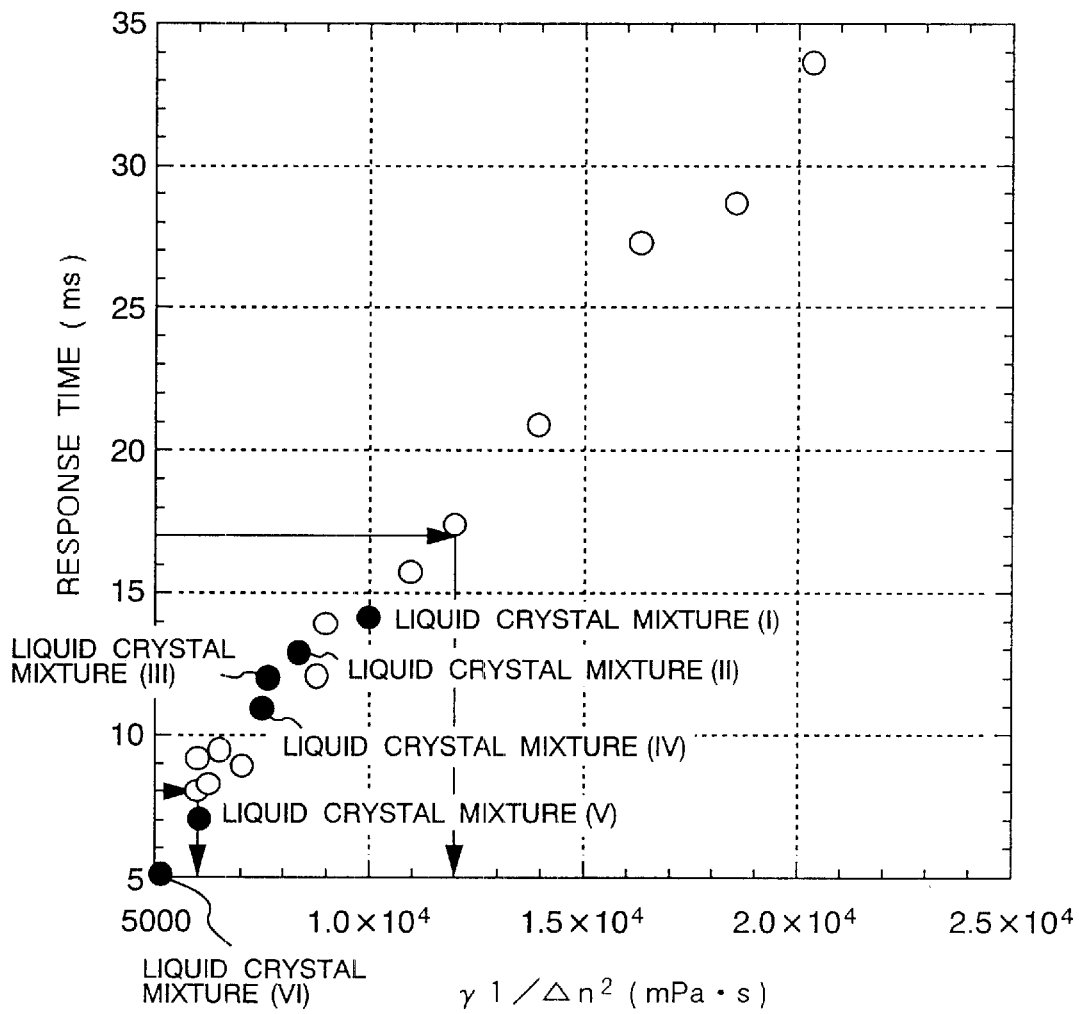
FIG. 9 is a graph showing the relationship between $\gamma 1/\Delta n^2$ of the liquid crystal material and the response time in the liquid crystal display device using in-plane switching mode according to the present invention.

Further, in the liquid crystal display device according to the present invention, as has been indicated above in Eqn. 1 and Eqn. 3, the response time depends not only on the viscosity of the liquid crystal, but also on the cell gap, that is, the parameter $\Delta n$ of the liquid crystal layer. In view of this, in the liquid crystal display device according to the present invention, the relationship between the parameter $\gamma 1/\Delta n^2$ and the response time between the voltages yielding the minimum brightness and the maximum brightness is shown by the graph in FIG. 9. From this graph, it became clear that it is sufficient if $\gamma 1/\Delta n^2 \leq 1.2 \times 10^4$ mPa·s in order to achieve a response time of less than 17 msec. The temperature at the time of measuring $\gamma 1$ and $\Delta n$ in this case was 25° C. Further, on the liquid crystal display screen, not only the minimum brightness and maximum brightness images are displayed, but also it is necessary to display images in gray levels between these two levels. Therefore, even the response times of gray levels are important. In the liquid crystal display devices using the in-plane switching mode adopted in the present invention, the response time of gray levels is about twice the response time between the minimum and maximum brightness levels. Therefore, in order to make even the response time of gray levels less than 17 msec, it is sufficient if the response time between the minimum and the maximum brightness levels is 8 msec, and hence it became clear that it is sufficient in this case if the condition $\gamma 1/\Delta n^2 \leq 6.0 \times 10^3$ mPa·s.

Figure 10:
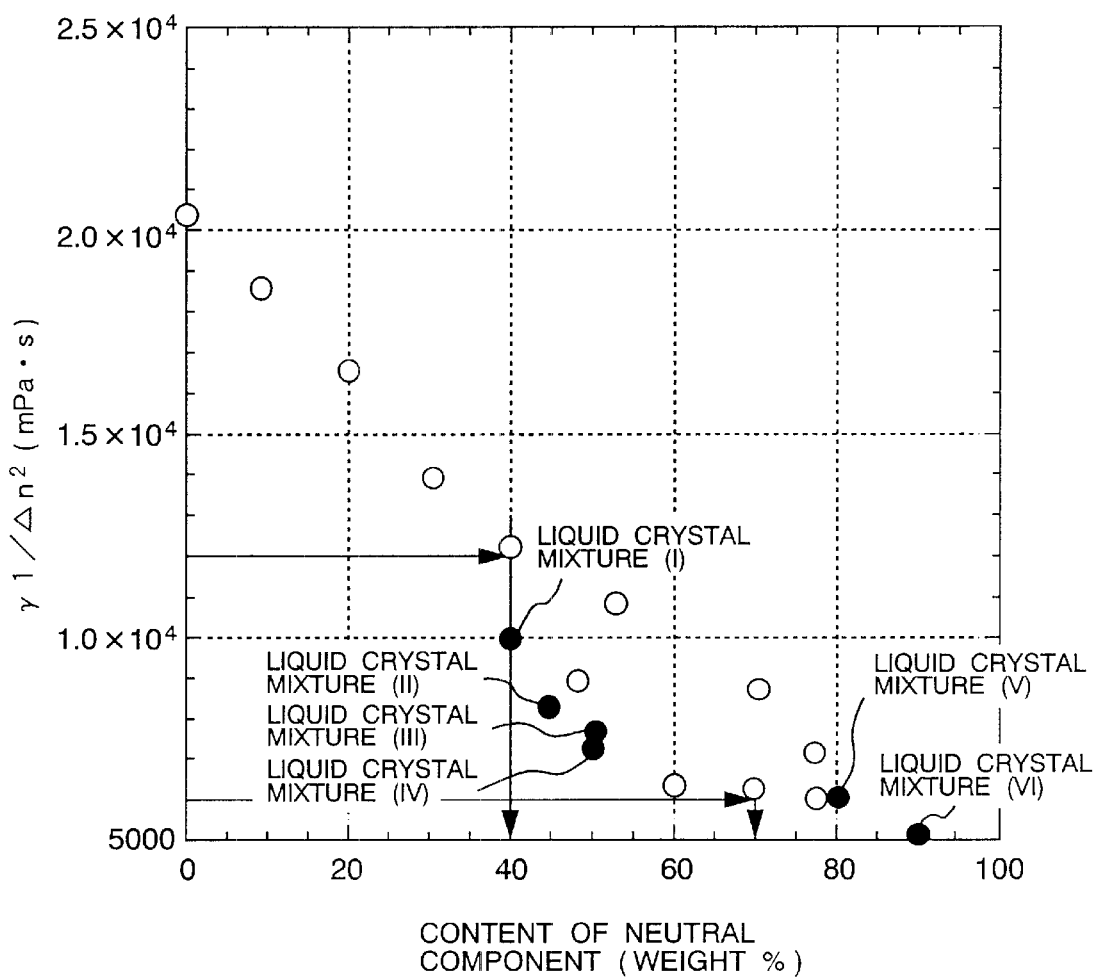
FIG. 10 is a graph showing the relationship between $\gamma 1/\Delta n^2$ of the liquid crystal material and the content of the neutral component in the liquid crystal material in the liquid crystal display device using in-plane switching mode according to the present invention.

Next, we investigated the relationship between the content of the neutral component and the parameter $\gamma 1/\Delta n^2$. The result is shown in FIG. 10. It was found that if the content of neutral content in the liquid crystal layer is made 40% or more by weight, it is possible to achieve the condition of $\gamma 1/\Delta n^2 \leq 1.2 \times 10^4$ mPa·s.

In the liquid crystal display device according to the present invention, the parameter d·$\Delta n$ is set so that—0.2 $\mu$m<d·$\Delta n$<0.4 $\mu$m where the birefringence of the liquid crystal layer is $\Delta n$ and its thickness is d. In display modes using the birefringence such as the in-plane switching mode, the intensity of the transmitted light measured by enclosing the liquid crystals between the polarizers whose axes of polarization are at right angles to each other, is proportional to $\sin(\pi d \cdot \Delta n/\lambda)$. Here, $\lambda$ is the wavelength of the light beams under consideration. In order to make the intensity of the transmitted light a maximum, while is sufficient to make d·$\Delta n$ equal to $\lambda/2$, $3\lambda/2$, $5\lambda/2$, ..., the setting is preferably made at $\lambda/2$ so that transmitted white light is obtained while suppressing dependency on the wavelength of the transmitted light. In other words, if light of 550 nm wavelength, which has a high visibility, is considered, d·$\Delta n$ will be equal to 0.275 $\mu$m. Such a value of d·$\Delta n$ should preferably be at least in the range from 0.2 $\mu$m to 0.4 $\mu$m for the sake of practicability.

The liquid crystal display device according to the present invention is of the in-plane switching mode type having spacers held between a pair of substrates, and the spacers held between said pair of substrates are in a non-displaying area. The effect of this is described below.

As has already been described above, when the content of the constituent component with $\Delta\in\leq 1$ in the liquid crystal layer is increased, the viscosity of the liquid crystal layer decreases, thereby making faster response speed possible. However, it became clear that the contrast gets reduced with an increase in the content of the neutral component in the liquid crystal layer. As a result of detailed investigation, it was found that as the content of the constituent component with $\Delta\in\leq 1$ in the liquid crystal layer is increased, the amount of light leakage around the spacers increases during black display. As has been described earlier, in the liquid crystal display device using the in-plane switching mode according to the present invention, the orientations of the polarizers or the direction of controlled orientation of liquid crystals are arranged so that the normally closed display is made in which black state is obtained at low driving voltages. Also, as has already been mentioned above, when spacers are present in the liquid crystal layer, the direction of orientation of liquid crystals is not uniform near the interface between the spacers and the liquid crystals thereby making the direction of orientation of the liquid crystals at the interface between the spacers and liquid crystals different, and consequently, there is light leakage around the spacers even at the black state, the brightness of black state increases, that is, the contrast becomes lower. This reduction in the contrast due to light leakage around the spacers is particularly significant in the case of normally closed type of liquid crystal displays. In the present invention, when the content of the neutral component in the liquid crystal layer is made 40% or more by weight, there was a particularly significant reduction in the contrast. From the results of detailed investigations, it was found that the significant reduction in contrast was caused by a significant increase in light leakage around the spacers. Therefore, in order to clarify the cause of light leakage around the spacers, we prepared the measurement cell shown in FIG. 11. This measurement cell is one in which the liquid crystal layer 1105 is held between the pair of glass substrates that are separated by the spacers 1104. Polyimide alignment layer 1103 are formed on the glass substrates, and their rubbing directions are mutually anti-parallel. In this cell, a mixed liquid crystal material with the composition ratio changed from those given by (1) and (2) below is injected, and the orientation of the liquid crystals around the spacers is observed in the condition in which the rubbing direction of the cell is aligned with the axis of polarization of one of the polarizers under the crossed nicols condition.

(1) Neutral component: Equal weight mixture of PCH302 (1-(4-ethoxyphenyl)-4-propylcyclohexane) and PCH304 (1-(4-butoxyphenyl)-4-propylcyclohexane) ($\Delta\in$ equal to about 0)

(2) Component with large $\Delta\in$: ZLI-1083 [a three-component mixture of cyano-PCH with $\Delta\in$ equal to about 10 (PCH stands for phenylcyclohexane)] manufactured by Merck Corporation.

The reason for using the equal quantity mixture of PCH302 and PCH304 in (1) above is, as has already been explained above, that it is effective in liquid crystal display devices using the in-plane switching mode to use at least 40% or more by weight of a liquid crystal material with $\Delta\in\leq 1$. In other words, the liquid crystal material of (1) was used as an example of liquid crystal materials with $\Delta\in\leq 1$.

As a result, in the case of a mixed liquid crystal material with 50% by weight of the liquid crystal material (1) and 50% by weight of the liquid crystal material (2), as is shown in FIG. 12(*a*), a ring-shaped bright part 1201 was observed on the periphery of the spacer 1204, and the outside of the bright part 1201 was dark. Further, dark cross-shaped lines 1202 and 1203 that coincided in direction with the axes of polarization of the polarizers were observed in the bright part 1201. When the details were observed using a polarizing microscope, it was suggested that the liquid crystal molecules 1301 around the spacer 1302 were oriented as shown in FIG. 13(*a*). Although in FIG. 13(*a*) only a single molecular layer has been shown around the spacers 1302, in actuality, multiple molecular layers were oriented in this manner over a region corresponding to almost the entire length of the bright part 1201 of FIG. 12 in the radial direction. In the dark part outside the bright part 1201, the liquid crystal molecules were oriented in a direction parallel to the rubbing direction. Therefore, outside the bright part 1201, the region has become a dark part because light cannot pass through the polarizers that are at right angles to each other. As is shown in FIG. 13(*a*), in the part where the liquid crystal molecules are oriented on the periphery of the spacer 1302, only the dark lines 1202 and 1203 in FIG. 12(*a*) are observed in the part where the direction of orientation of the liquid crystal molecules 1301 is aligned with the axes of polarization of the polarizers. The part where the direction of orientation of the liquid crystal molecules is inclined relative to the axes of polarization of the polarizers becomes the bright part 1201 in FIG. 12(*a*) because of the generation of polarized light components that can pass through the polarizers.

Further, the conditions on the periphery of the spacer are shown in FIGS. 12(*b*) and (*c*) in the case of a mixed liquid crystal material with 45% by weight of the liquid crystal material (1) and 55% by weight of the liquid crystal material (2), and in the case of a mixed liquid crystal material with 40% by weight of the liquid crystal material (1) and 60% by weight of the liquid crystal material (2), respectively. In these cases, unlike in the case of a mixed liquid crystal material with 50% by weight of the liquid crystal material (1) and 50% by weight of the liquid crystal material (2) shown earlier, dark lines 1205 and 1206 appeared newly in directions different from the axes of polarization of the polarizers in the bright part 1201. Upon detailed investigation, as is shown in FIGS. 13(*b*) and (*c*), it was suggested that the condition of orientation of the liquid crystal molecules was a mixed presence of liquid crystal molecules 1301 that are oriented perpendicular to the surface of the spacer 1302 and liquid crystal molecules 1301 that are oriented parallel to the surface.

Furthermore, when these liquid crystal materials were injected in the liquid crystal display device shown in FIG. 1 and the contrast was measured, the contrast ratio decreased in the sequence 200:1, 160:1, and 100:1, respectively for the materials with liquid crystal material (1): liquid crystal material (2)=40% by weight 60% by weight, liquid crystal material (1): liquid crystal material (2)=45% by weight: 55% by weight, liquid crystal material (1): liquid crystal material (2)=50% by weight 50% by weight, respectively. In other words, the contrast decreased as the content of the liquid crystal material (1) that has $\Delta\epsilon \leq 1$ was increased. In particular, at 50% or more by weight of the neutral component, the light leakage becomes larger and the contrast gets reduced. This can be explained be the fact that, when the content of the neutral liquid crystal component material is increased, the liquid crystal molecules on the surface of the spacers go into the orientation condition shown in FIG. 13(*a*) as has been explained above, and in this condition of orientation, the light leakage around the spacers increases during black display. In other words, increasing the content of the liquid crystal material having $\Delta\epsilon \leq 1$ to obtain a faster response and obtaining high contrast ratio have a mutual trade-off relationship.

In view of this, as a means for avoiding said trade-off and achieving both low driving voltage and high contrast ratio, the spacers are placed outside the displaying region (the pixel region) in the present invention. Because of this, by increasing the content of the neutral liquid crystal component material, even if the light leakage around the spacers gets increased, the brightness at the black state does not get increased because the spacers are not present in the displaying region. This means that a high contrast can be achieved. This non-displaying region where the spacers are placed is, for example in FIG. 1, on the electrode substrate, the area where no light is transmitted such as on the common electrodes 102, pixel electrodes 103, and video signal electrodes 110. On a substrate with color filters formed on it, the area where no light is transmitted is in the black matrix 1411 (FIG. 14), which is the light cut-off area. The method of placing spherical-shaped spacers selectively in the non-displaying region, or the method of forming pillar-shaped spacers in the non-displaying region, etc., are used as methods of placing spacers in the non-displaying region. The method of forming pillar-shaped spacers can be that of using photosensitive materials and photolithographic processes to form the spacers in the required locations easily, and the use of this method is more desirable. An example of a liquid crystal display device using pillar-shaped spacers according to the present invention is shown in FIG. 14. The liquid crystal display device shown in FIG. 14 is an example in which the planarizing film 1407 formed on the color filter 1405 and the pillar shaped spacer 1412 are formed simultaneously using a photosensitive polymer. In this manner, in the present invention, by making the content of neutral component in the liquid crystal layer 40% or more by weight and placing the spacers in a non-displaying region, it has been possible to achieve a high response speed with the response time being less than one-frame period and also to obtain a high contrast ratio by suppressing the brightness increase during black state.

Further, in the present invention, as a constituent component with $\Delta\epsilon \leq 1$ it is possible to use chemical compounds having two ring structures in the molecule, and these ring structures can be combinations of a benzene ring and a hexane ring. The typical structures of chemical compounds having such structures are given in the chemical formulae shown below.

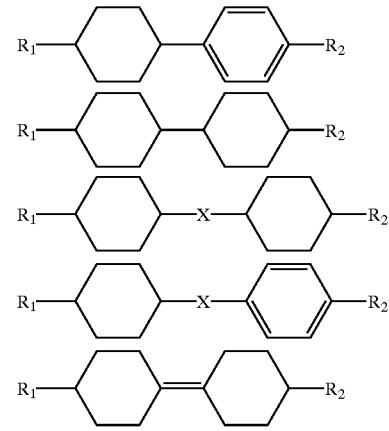

(R1 and R2 in these formulae represent substituents that are either identical to each other or are different from each other, and are either an alkyl group, an alkenyl group, or an alkoxyl group with the number of carbon of 12 or less. X represents an alkylene group, an alkenyl group, a triple carbon-carbon bond, an ether group, or an ester group.)

Concrete examples of such chemical compounds are shown in the chemical formulae given below.

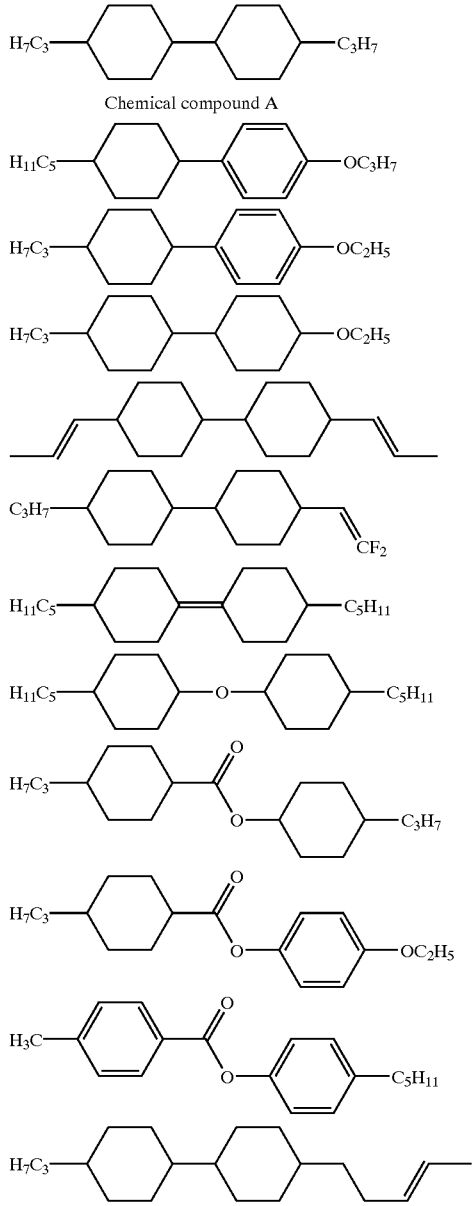

Chemical compound A

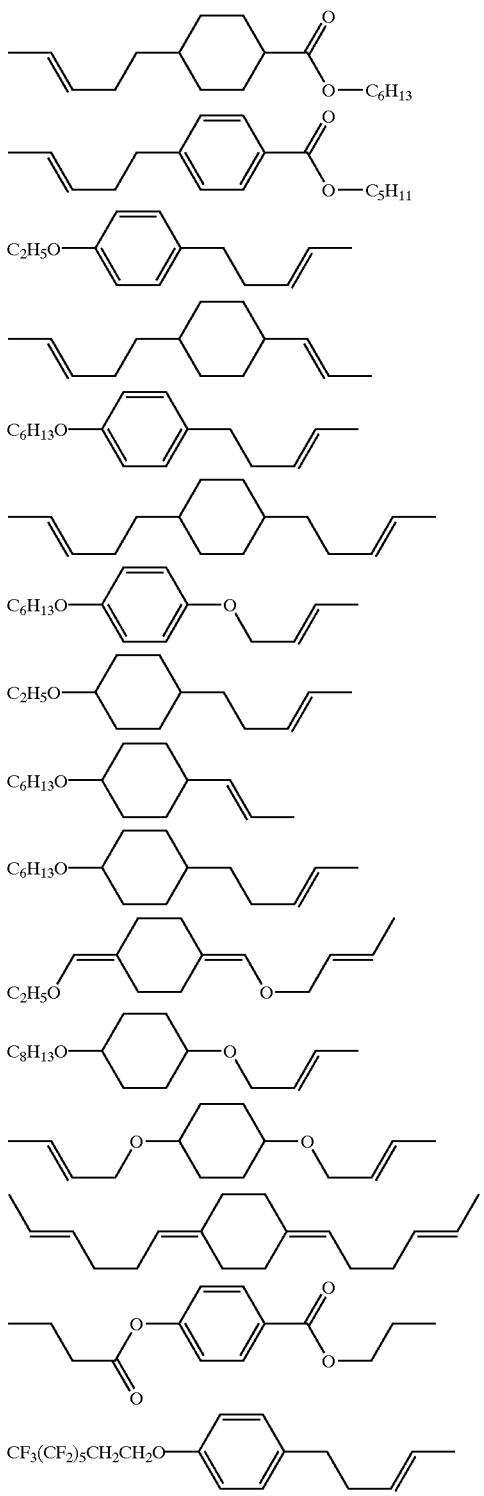

As has been described above, since the dipole moments of such chemical compounds having such structures are very small being near 0, the intermolecular interaction is small, and hence it is possible to make the viscosity low.

Further, in the present invention, the characteristic is that is that chemical compounds having a single ring structure that contain only one ring structure in the molecule are used as the constituent component with $\Delta\varepsilon \leq 1$ in the liquid crystal material. Concrete examples of such chemical compounds are shown in the chemical formulae given below.

Chemical compounds with single ring structures in the molecules reduce the viscosity and hence it is possible to achieve high response speeds. Only benzene ring structures or hexane ring structures are desirable in single ring structures. In addition, it is desirable that such ring structures contain to alkyl groups, alkenyl groups, or alkoxyl groups. Chemical compounds with such single ring structures particularly have a large effect of reducing the viscosity, and are very beneficial for achieving high response speeds. Further, since the structure is a single ring structure, it is possible to make the birefringence Δn small, thereby making it also possible to reduce the color sift dependent upon the viewing angle that is typical in the liquid crystal displays using in-plane switching mode. This is because the color sifts dependent upon the viewing angle in the liquid crystal displays using in-plane switching mode are caused by changes in the cell gap and Δn of the liquid crystals according to the viewing angle. Therefore, if Δn is basically small, even the amount of its change becomes small, and hence changes in the color depending on the viewing angle get reduced.

In the liquid crystal display device according to the present invention, the liquid crystal layer contains 40% or more by weight of a constituent component with Δ∈≦1. Therefore, Δ∈ becomes small thereby increasing the driving voltage. Considering this, in order to achieve the second objective of the present invention, which is that of achieving also a low driving voltage while obtaining both fast response and high contrast ratio, chemical compounds which have 4-cyano-3-fluorophenyl, 4-cyano-3,5-difluorophenyl structures in the molecules are contained in the liquid crystal layer. Particularly desirable is a chemical compound with 4-cyano-3,5-difluorophenyl structure in the molecule. As has been explained earlier, these chemical compounds have high polarity and large dipole moments with large Δ∈ values. For example, chemical compounds containing cyanofluorophenyl and cyanodifluorophenyl structures in the molecules have extremely large values of Δ∈ of more than 20 to about 60, and it is possible to make the value of Δ∈ of the overall liquid crystal mixture large by adding only a small quantity of these compounds. Examples of such chemical compounds are given by the following chemical formulae.

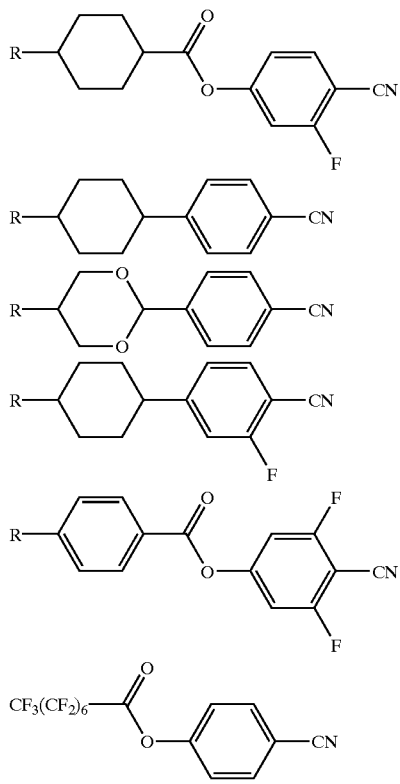

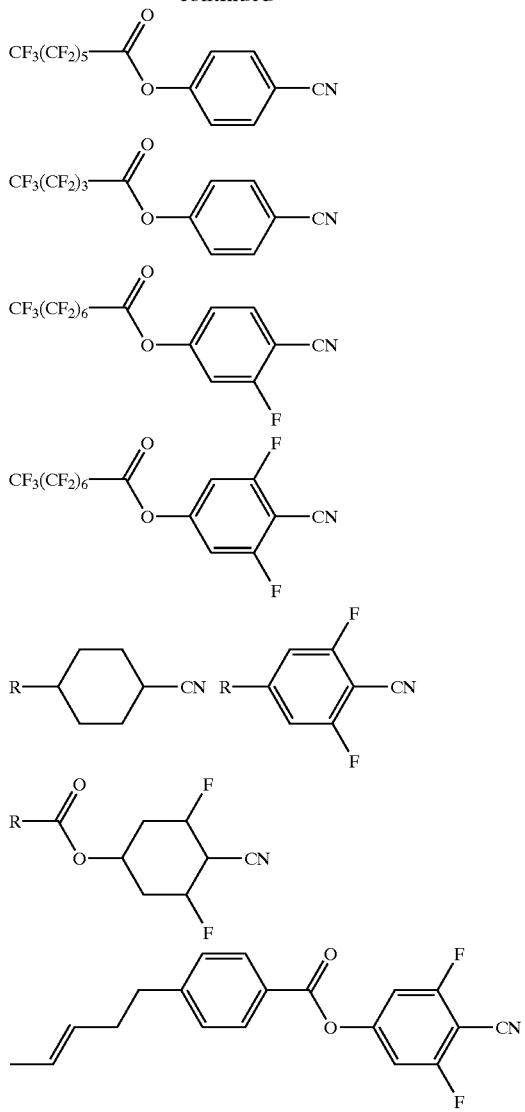

Chemical compound B

In the liquid crystal display device according to the present invention, a new problem was found when attempts were made to reduce the driving voltage by using said liquid crystal component material with a high polarity and a neutral component material in the liquid crystal mixture. This is a problem related to the miscibility between the liquid crystal materials. With a combination of said high polar component and a neutral component, the miscibility, and consequently, the stability of the liquid crystal phase becomes lower, and particularly at low temperatures, there was the problem of precipitation of the components from the mixtures.

Such problems of miscibility in liquid crystal mixtures, are treated as problems in mixing ideal solutions, as has been indicated in the paper by Y. Tanaka and S. Naemura, IDW '97 Proceedings, pp. 41–44, and methods are being studied for suppressing the precipitation of the liquid crystal components at low temperatures. However, from the results of similar studies, it was found not possible to reproduce actually low temperature stability by treating as ideal solutions. In particular, as in the present invention, with combinations of a neutral component and a high polar component, it was not possible to solve the problem of miscibility by treating in the said manner. Therefore, in the present invention, sufficient consideration has been given to the intermolecular interaction between the liquid crystal constituent components, and in order to solve the problem of miscibility, we adopted solubility parameters of liquid crystal constituent components. In concrete terms, we used the method of calculating solubility parameters given in the paper by R. F. Fedors, Polymer Engineering and Science, 1974, Vol. 14, No. 2, pp. 147–154). As a result, the low temperature stability predicted by calculations agreed well with the low temperature stability of actual liquid crystal mixtures, and also it was possible to obtain valuable knowledge.

In other words, since it has become possible to estimate the effect of intermolecular interaction on the miscibility of liquid crystals from the solubility parameters, it was possible to obtain guide lines for improving the low temperature stability of liquid crystal mixtures by taking into consideration the solubility parameters of liquid crystal components.

Therefore, it was found possible to improve the low temperature stability by a great amount by adding liquid crystal components with medium porarity between those of the low polar neutral component and the high polar component containing a 4-cyano-3-fluorophenyl, or a 4-cyano-3,5-difluorophenyl structure in the molecule.

In specific terms, a solubility parameter value of about 8.3 was obtained for the chemical compound A given by the chemical formula 9 and which is a neutral component. Also a solubility parameter value of about 11.8 was obtained for the chemical compound B given by the chemical formula 10 and which is a high polar component. Therefore, it is sufficient to add compounds with solubility parameters in the medium range between the above of 8.4–11.7. Further, other neutral components mostly have solubility parameters of 9.2 or less, and since the high polar components used in the present invention have solubility parameter values of 10.8 or more, it is preferable to use a component with a solubility parameter of 9.3 to 10.7 as the medium polar component. Consequently, it becomes possible to include a large number of high polar components.

It is still more desirable to use an medium polar component with $\Delta\in>0$. As a result of that, the value of $\Delta\in$ of the liquid crystal mixture becomes larger, thereby making the driving voltage lower. In specific terms, it is possible to use chemical compounds having monofluorobenzene, difluorobenzene, trifluorobenzene, monofluorocyclohexyl, difluorocyclohexyl, trifluorocyclohexyl, cyanobenzene, or cyanocyclohexyl structures in the molecule.

Since the liquid crystal layer contains 40% or more and less than 100% by weight, or in practice, 40% to 90% by weight of the neutral component, it is possible to achieve a low driving voltage and to greatly improve the low temperature stability by including in the liquid crystal layer said medium polar component and high. polar component to the amount of less than 60% by weight or, in actual practice, 10% or more but less than 60% by weight.

Further, in the present invention, when an opaque material, as for example, chromium is used, the spacing L between the pixel electrodes and the common electrodes, the birefringence $\Delta n$ of said liquid crystal layer, and the dielectric anisotropy $\Delta\in$, are set so that $L\Delta n/\sqrt{\Delta\in}\leq 0.55$ $\mu$m, or still better, so that $L\Delta n/\sqrt{\Delta\in}\leq 0.4$ $\mu$m. As can be understood from Eqn. 2 and Eqn. 4, in the in-plane switching mode, the driving voltage is dependent on the spacing L between the pixel electrodes and the common electrodes, $\Delta n$, and $\Delta\in$. Therefore, although the driving voltage becomes smaller as L is made small, when an opaque material is being used for the electrodes, simultaneously the aperture ratio becomes smaller, that is, the brightness decreases. Therefore, it is necessary to make L large to some extent. In actuality, L is in the range of 20 $\mu$m to 5 $\mu$m. From the results of experiments it was found that, in order to make the driving voltage equal to a value that permit driving the display device using existing drivers, it is necessary to make $L\Delta n/\sqrt{\Delta\in}\leq 0.55$ $\mu$m. Further, it is still more desirable that $L\Delta n/\sqrt{\Delta\in}\leq 0.4$ $\mu$m.

Further, in the present invention, the birefringence $\Delta n$ and the dielectric anisotropy $\Delta\in$ are set so that they satisfy the condition of $\Delta n/\sqrt{\Delta\in}\leq 5.5\times 10^{-2}$, and still more preferably, the condition $\Delta n/\sqrt{\Delta\in}\leq 2.7\times 10^{-2}$. The effect of this is described below.

On the one hand, when the electrodes are made of a transparent material, such as indium-tin-oxide, there is almost no reduction in the brightness even when L is small, and it is possible to reduce the driving voltage. However, if L=0, that is, even if the structure is such that the pixel electrodes and the common electrodes are overlapping each other, as is shown in FIG. 5 and FIG. 7, it was found from experiments that it is not possible to make the driving voltage zero. Therefore, when L is small, it is necessary to revise Eqn. 2 and Eqn. 4. Upon experimental verification, when L=0, it was found that the driving voltage will be in a range in which it is possible to drive using the current drivers if the setting is made such that $\Delta n/\sqrt{\Delta\in}\leq 5.5\times 10^{-2}$.

Further, it is possible to achieve low driving voltage even by making the dielectric anisotropy of the liquid crystal layer $\Delta\in\geq 7$, and the twist elastic constant $K_{22}\leq 5.5$ pN.

In the following, the preferred embodiments of the present invention are described concretely.

[PREFERRED EMBODIMENT 1]

First, the method of manufacturing an active matrix type liquid crystal display device according to the present invention is described here using FIG. 4 and FIG. 14 as the first preferred embodiment of the present invention. The common electrodes 402 and the scanning signal electrodes 414 are formed on the glass substrate 401. Next, the insulating layer 404 is formed on top of these electrodes, on top of which are formed the video signal electrodes 410, the pixel electrodes 403, and the TFT 415 comprising the amorphous silicon layer 416. In this first preferred embodiment, the common electrodes 402 and the pixel electrodes 403 are made of chromium, which does not transmit light in the visible region. Also, the spacing between the common electrodes and the pixel electrodes is 13 $\mu$m. Further, on top these is formed the insulating layer 404. In addition, each pixel is separated into four segments by the common electrodes 402 parallel to the video signal electrode and the pixel electrodes 403. On top of the substrate containing this set of electrodes is formed the alignment layer 408 using Optomer-AL3046 manufactured by JSR Co., Ltd. After the alignment layer is formed, orientation processing is carried out on the surface of the alignment layer by the rubbing method.

Next, in FIG. 14, on the substrate 1401' opposite to this substrate 1401 containing the TFT 415 are formed the color filter 1405 and the black matrix 1411. The planarizing film 1407 is formed on top of the color filter 1405. At this time, a photosensitive polymer is used for the planarizing film 1407, and pillar shaped spacers 1412 are formed on top of the black matrix 1411 simultaneously with the formation of the planarizing film 1407 by photolithographic techniques. Next, the alignment layer 1408 is formed and rubbing operation is made as in the case of the substrate 1401. The two substrates 1401 and 1401' placed opposite to each other so that their rubbing directions are the same, and are bonded together using a sealant (not shown in the figure). In the present preferred embodiment of the invention, the spacing d between the substrate was about 3.1 μm. After injecting the liquid crystal material in the space between the substrates, the polarizers 1409 and 1409' were adhered to the substrates, thereby completing the preparation of the liquid crystal display device shown in FIG. 14. The polarizer film 1409 is aligned so that its polarized light transmission axis is almost aligned with the rubbing direction, and the polarized light transmission axis of the other polarizer film 1409' is made almost perpendicular to it. This relationship is shown in FIG. 3. Because of this, the transmittance increases with an increase in the voltage applied to the liquid crystal layer, that is, it is possible to obtain the so-called normally closed characteristics.

Figure 15:
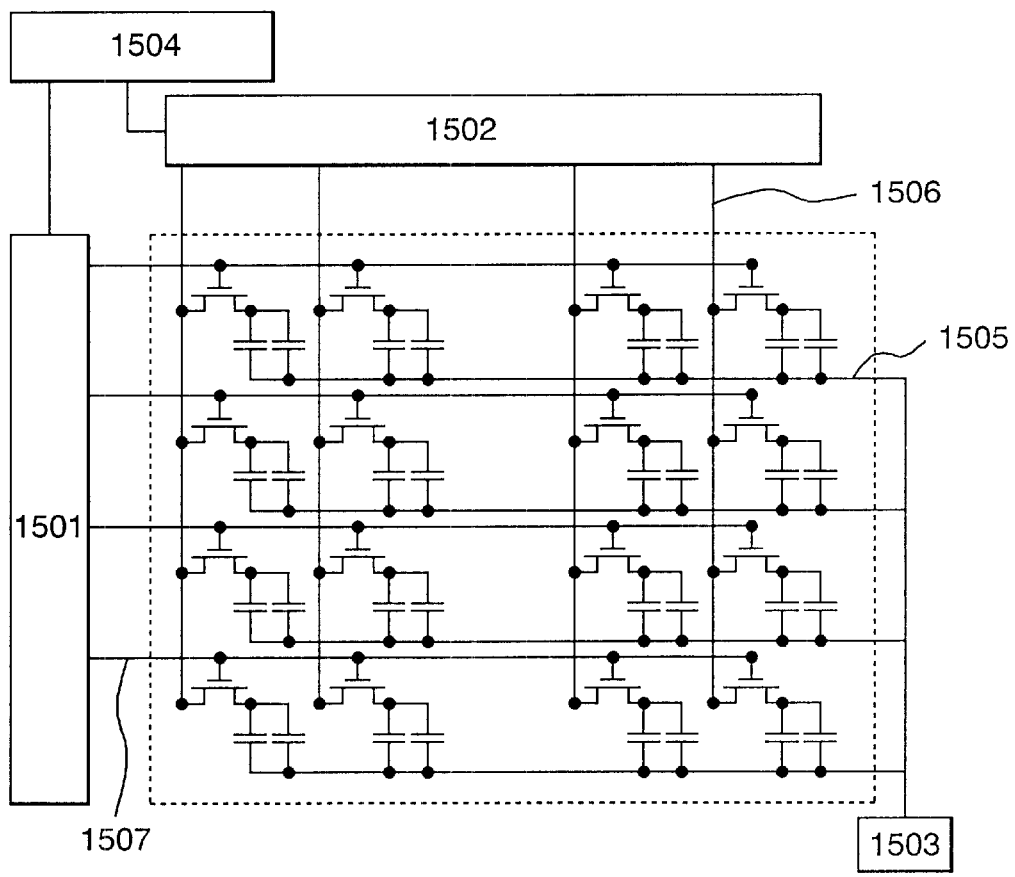
FIG. 15 shows an example of the circuit system configuration in the liquid crystal display device of the preferred embodiment 1.

Next, as is shown in FIG. 15, the driving LSI is connected, the vertical scanning circuit 1501, the video signal driving circuit 1502, and the common electrode driving circuit 1503 on the TFT substrate are connected, and the scanning signal voltage, the video signal voltage, and the timing signals are supplied from the power supply circuit and the controller 1504, thereby preparing the active matrix type liquid crystal display device. In this figure, 1505 is the common electrode line, 1506 is the video signal electrode line, and 1507 is the scanning signal electrode line. The scanning frequency of the liquid crystal display device in the present preferred embodiment is 60 Hz.

Figure 16:
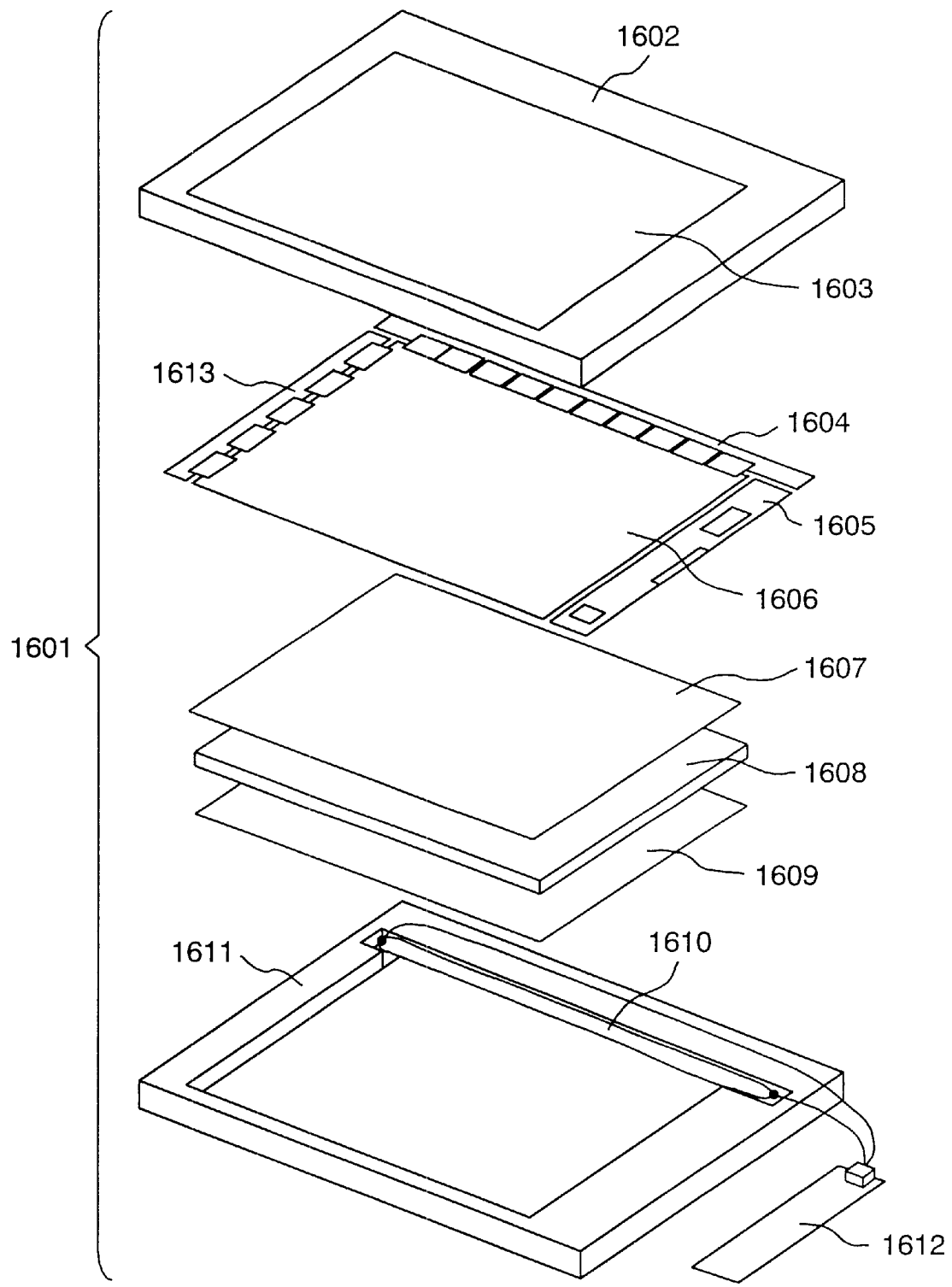
FIG. 16 is an exploded pictorial view showing the different constituent parts of the liquid crystal display device of the preferred embodiment 1.

FIG. 16 is an exploded pictorial view showing the different constituent parts of the liquid crystal display module 1601 of the preferred embodiment 1. Here, 1602 is a frame-shaped shield case (metal frame) made from a metallic plate, 1603 is its display window, 1606 is the liquid crystal display panel, 1605 is the power supply circuit board, 1607 is the optical scattering plate, 1608 is the light guide, 1609 is the reflector plate, 1610 is. the back-light fluorescent tube, and 1611 is the back-light case, and these parts are all piled up on each other in the placement relationship shown in the figure thereby assembling the module 1601. The inverter circuit board 1612 is connected to the back-light fluorescent tube 1610 and becomes the power supply to the back-light fluorescent tube. In this figure, 1613 is the vertical scanning circuit (1501 in FIG. 15) and 1604 is the video signal driving circuit (1502 in FIG. 15). The liquid crystal display panel 1606 in the present preferred embodiment of the invention has a size of 15.0-inch diagonal and has XGA resolution (1024×768×3 dots).

Figure 17:
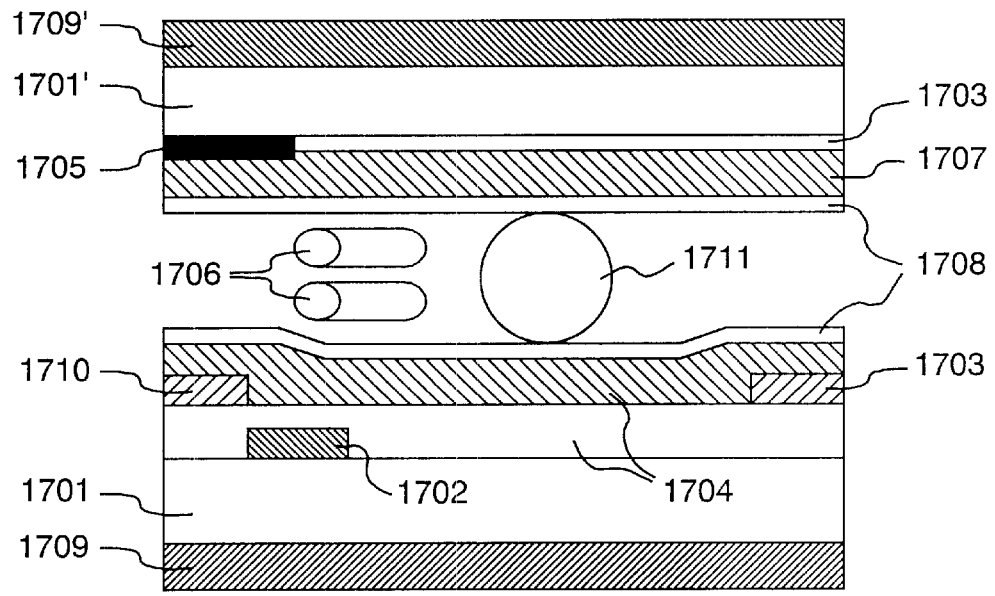
FIG. 17 is a schematic cross-sectional diagram of a pixel section of a liquid crystal display device using spherical spacers in a preferred embodiment of the present invention.

Next, for the sake of comparison, we prepared a liquid crystal display panel with spherical spacers distributed between the substrates instead of pillar shaped spacers. FIG. 17 shows the cross-sectional diagram of that liquid crystal display panel. Although the method of manufacturing the substrates is the same as that described for the above liquid crystal display panel, the pillar shaped spacers were not formed at the time of forming the planarizing film 1707. At the time of bonding together the substrates, spherical spacers 1711 were dispersed on the substrate. All other steps in the method of manufacture were identical to that of the liquid crystal display device described above.

The liquid crystal material used in the present preferred embodiment consists of a mixture of 15% by weight of a liquid crystal compound with phenyl cyclohexane structure and 25% by weight of a liquid crystal compound with bicyclohexyl structure making up a total of 40% by weight of the liquid crystal material with $\Delta\epsilon \leq 1$, 15% by weight of a liquid crystal compound having a cyanophenyl group and a compound having a 4-cyano-3,5-difluorophenyl group, and 45% by weight of a liquid crystal compound having a 3,4,5-trifluorophenyl group, which are all mixed together to form the liquid crystal mixture (I). When the physical parameters of this liquid crystal composite material were measured (at 25° C.), they were found to be: $\gamma 1=88$ mPa·s, $\Delta n=0.094$, $\Delta\epsilon=8.5$, and $K_{22}=5.5$ pN. Therefore, in the liquid crystal display device according to the present preferred embodiment of the invention, $\gamma 1/\Delta n^2$ was $1.0 \times 10^4$ mPa·s, and d·$\Delta n$ was 0.291 μm. In addition, $L\Delta n/\sqrt{\Delta\epsilon}$ was 0.42 which is less than 0.55.

When this liquid crystal component material (I) was used in said liquid crystal display device, the liquid crystal response time was 14 msec when the voltage was changed from that for minimum brightness to that for maximum brightness. Thus, this response time was smaller than the one-frame period in the present preferred embodiment, which is 1/60=16.7 msec.

The contrast ratios of the liquid crystal display device using pillar shaped spacers shown in FIG. 14 and the liquid crystal display device using spherical spacers shown in FIG. 17 were 350:1 and 200:1, respectively. When the liquid crystal alignment around the spacers in a liquid crystal display device using spherical spacers was observed under a microscope, it was almost the same as that shown in FIG. 12(c).

Further, it was possible to apply a voltage to the liquid crystals using the driving IC that was sufficient to give the maximum brightness.

[PREFERRED EMBODIMENT 2]

In a liquid crystal display device prepared in a manner similar to that of Preferred Embodiment 1 above, we injected a liquid crystal mixture consisting of—a mixture of 16% by weight of a liquid crystal compound with phenyl-cyclohexane structure and 29% by weight of a liquid crystal compound with bicyclohexyl structure making up a total of 45% by weight of the liquid crystal material with $\Delta\epsilon \leq 1$, 20% by weight of a liquid crystal compound having a 4-cyano-3,5-difluorophenyl group, and 35% by weight of a liquid crystal compound having a 3,4,5-trifluorophenyl group, which are all mixed together to form the liquid crystal mixture (II). The physical parameters of this liquid crystal mixture were found to be: $\gamma 1=75$ mPa·s, $\Delta n=0.096$, and $\Delta\epsilon=9.0$. Therefore, in the liquid crystal display device according to the present preferred embodiment of the invention, $\gamma 1/\Delta n^2$ was $8.14 \times 10^3$ mPa·s, and d·$\Delta n$ was 0.298 μm. In addition, $L\Delta n/\sqrt{\Delta\epsilon}$ was 0.42 which is less than 0.55.

Further, in the liquid crystal display device according to the present preferred embodiment of the invention, the liquid crystal response time was 13 msec when the voltage was changed from that for minimum brightness to that for maximum brightness. Thus, this response time was smaller than the one-frame period in the present preferred embodiment, which is 1/60=16.7 msec.

The contrast ratios of the liquid crystal display device using pillar shaped spacers and the liquid crystal display device using spherical spacers were 340:1 and 190:1, respectively. When the liquid crystal alignment around the spacers in a liquid crystal display device using spherical spacers was observed under a microscope, it was almost the same as that shown in FIG. 12(b).

Further, it was possible to apply a voltage to the liquid crystals using the driving IC that was sufficient to give the maximum brightness.

[PREFERRED EMBODIMENT 3]

In a liquid crystal display device prepared in a manner similar to that of Preferred Embodiment 1 above, we injected a liquid crystal mixture consisting of—a mixture of 10% by weight of a liquid crystal compound with phenylcyclohexane structure, 30% by weight of a liquid crystal compound with bicyclohexyl structure, and 10% by weight of a liquid crystal compound with phenylbicyclohexane structure making up a total of 50% by weight of the liquid crystal material with $\Delta\in\leq1$, 25% by weight of a liquid crystal compound having a 4-cyano-3-fluorophenyl group and a liquid crystal compound having a 4-cyano-3,5-difluorophenyl group, and 25% by weight of a liquid crystal chemical compound having a 3,4,5-trifluorophenyl group, which are all mixed together to form the liquid crystal mixture (III). The physical parameters of this liquid crystal composite material were found to be: $\gamma1=70$ mPa·s, $\Delta n=0.096$, and $\Delta\in=9.0$. Therefore, in the liquid crystal display device according to the present preferred embodiment of the invention, $\gamma1/\Delta n^2$ was $7.6\times10^3$ mPa·s, and d·$\Delta n$ was $0.298\,\mu m$. In addition, $L\Delta n/\sqrt{\Delta\in}$ was 0.42 which is less than 0.55.

Further, in the liquid crystal display device according to the present preferred embodiment of the invention, the liquid crystal response time was 12 msec when the voltage was changed from that for minimum brightness to that for maximum brightness. Thus, this response time was smaller than the one-frame period in the present preferred embodiment, which is 1/60=16.7 msec.

The contrast ratios of the liquid crystal display device using pillar shaped spacers and the liquid crystal display device using spherical spacers were 340:1 and 150:1, respectively. When the liquid crystal alignment around the spacers in a liquid crystal display device using spherical spacers was observed under a microscope, it was almost the same as that shown in FIG. 12(a).

Further, it was possible to apply a voltage to the liquid crystals using the driving IC that was sufficient to give the maximum brightness.

[PREFERRED EMBODIMENT 4]

In a liquid crystal display device prepared in a manner similar to that of Preferred Embodiment 1 above, we injected a liquid crystal mixture consisting of—a mixture of 20% by weight of a liquid crystal compound with a phenylcyclohexane structure, 10% by weight of a liquid crystal compound with a bicyclohexyl structure, 10% by weight of a liquid crystal chemical compound with a phenylbicyclohexane structure, and 10% by weight of dialkenyloxybenzene derivatives making up a total of 50% by weight of the liquid crystal material with $\Delta\in\leq1$, 25% by weight of a liquid crystal compound having a 4-cyano-3-fluorophenyl group and a liquid crystal compound having a 4-cyano-3,5-difluorophenyl group, and 25% by weight of a liquid crystal chemical compound having a 3,4,5-trifluorophenyl group, which are all mixed together to form the liquid crystal mixture (IV). The physical parameters of this liquid crystal mixture were found to be: $\gamma1=65$ mPa·s, $\Delta n=0.093$, and $\Delta\in=8.5$. Therefore, in the liquid crystal display device according to the present preferred embodiment of the invention, $\gamma1/\Delta n^2$ was $7.5\times10^3$ mPa·s, and d·$\Delta n$ was 0.288 $\mu m$. In addition, $L\Delta n/\sqrt{\Delta\in}$ was 0.41 which is less than 0.55.

Further, in the liquid crystal display device according to the present preferred embodiment of the invention, the liquid crystal response time was 11 msec when the voltage was changed from that for minimum brightness to that for maximum brightness. Thus, this response time was smaller than the one-frame period in the present preferred embodiment, which is 1/60=16.7 msec.

The contrast ratios of the liquid crystal display device using pillar shaped spacers and the liquid crystal display device using spherical spacers were 350:1 and 150:1, respectively. When the liquid crystal alignment around the spacers in a liquid crystal display device using spherical spacers was observed under a microscope, it was almost the same as that shown in FIG. 12(a).

Further, it was possible to apply a voltage to the liquid crystals using the driving IC that was sufficient to give the maximum brightness.

[PREFERRED EMBODIMENT 5]

In a liquid crystal display device prepared in a manner similar to that of Preferred Embodiment 1 above, we injected a liquid crystal constituent material consisting of—a mixture of 30% by weight of a liquid crystal compound with a phenylcyclohexane structure, 20% by weight of a liquid crystal compound with a bicyclohexyl structure, 20% by weight of a liquid crystal compound with a phenylbicyclohexane structure, and 10% by weight of dialkenyloxybenzene derivatives making up a total of 80% by weight of the liquid crystal material $\Delta\in\leq1$, 10% by weight of a liquid crystal compound having a 4-cyano-3,5-difluorophenyl group, and 10% by weight of a liquid crystal compound having a 3,4,5-trifluorophenyl group, which are all mixed together to form the liquid crystal mixture (V). The physical parameters of this liquid crystal composite material were found to be: $\gamma1=55$ mPa·s, $\Delta n=0.096$, and $\Delta\in=5.5$. Therefore, in the liquid crystal display device according to the present preferred embodiment of the invention, $\gamma1/\Delta n^2$ was $6.0\times10^3$ mPa·s, and d·$\Delta n$ was 0.298 $\mu m$. In addition, $L\Delta n/\sqrt{\Delta\in}$ was 0.53 which is less than 0.55.

Further, in the liquid crystal display device according to the present preferred embodiment of the invention, the liquid crystal response time was 7 msec when the voltage was changed from that for minimum brightness to that for maximum brightness. Thus, this response time was smaller than the one-frame period in the present preferred embodiment, which is 1/60=16.7 msec. In addition, when the response time of gray levels was measured, even the worst response time was 16 msec, which is a response time less than one-frame period.

The contrast ratios of the liquid crystal display device using pillar shaped spacers and the liquid crystal display device using spherical spacers were 350:1 and 140:1, respectively. When the liquid crystal alignment around the spacers in a liquid crystal display device using spherical spacers was observed under a microscope, it was almost the same as that shown in FIG. 12(a).

[PREFERRED EMBODIMENT 6]

Next, the active matrix type liquid crystal display device according to a second example of the preferred embodiments of the present invention is described below using FIG. 7. The major point of difference from the liquid crystal display device described in Preferred Embodiment 1 is that, in this case, the material of the pixel electrodes 703 and the common electrodes 702 is ITO, which is a transparent conductive material.

The common electrodes 702 and the scanning signal electrodes 714 are formed on the glass substrate 701. Next, the insulating film 704 is formed on top of these electrodes, on top of which are formed the video signal electrodes 710, the source electrodes 717, and the TFT 715 comprising the amorphous silicon layer 716. Next, the pixel electrodes 703 are formed on the insulating film 704'. The source electrodes and the pixel electrodes 703 are in electrical contact with each other. On top of the substrate containing this set of electrodes is formed the alignment layer 708 using Optomer-AL3046 manufactured by JSR Co., Ltd. After the alignment layer is formed, orientation processing is carried out on the surface of the layer by the rubbing method. All other steps of preparation are identical to those described earlier for the Preferred Embodiment 1, and both liquid crystal display devices with pillar shaped spacers and liquid crystal display devices with spherical spacers were prepared. In addition, the order of vertical placement of the different layers of electrodes on the substrate given in this preferred embodiment is only a sample provided for reference, and does not restrict the intentions and extent of the present invention.

The liquid crystal mixture (V) described in Preferred Embodiment 5 was injected into the liquid crystal display device prepared as above. In this case, it was found that $\Delta n/\sqrt{\Delta\epsilon}=4.2\times10^{-2}\leq5.5\times10^{-2}$.

Further, in the liquid crystal display device. according to the present preferred embodiment of the invention, the liquid crystal response time was 7 msec when the voltage was changed from that for minimum brightness to that for maximum brightness. Thus, this response time was smaller than the one-frame period in the present preferred embodiment, which is 1/60=16.7 msec. In addition, when the response time of gray levels was measured, even the worst response time was 15 msec, which is a response time less than one-frame period.

The contrast ratios of the liquid crystal display device using pillar shaped spacers and the liquid crystal display device using spherical spacers were 350:1 and 140:1, respectively. When the liquid crystal alignment around the spacers in a liquid crystal display device using spherical spacers was observed under a microscope, it was almost the same as that shown in FIG. 12(a).

Further, it was possible to apply a voltage to the liquid crystals using the driving IC that was sufficient to give the maximum brightness.

[PREFERRED EMBODIMENT 7]

In a liquid crystal display device prepared in a manner similar to that of Preferred Embodiment 6 above, we injected a liquid crystal mixture consisting of—a mixture of 25% by weight of a liquid crystal compound with a phenylcyclohexane structure, 20% by weight of a liquid crystal compound with a bicyclohexyl structure, 20% by weight of a liquid crystal compound with a phenylbicyclohexane structure, 10% by weight of dialkenylcyclohexane derivatives, and 10% by weight of dialkenyloxybenzene derivatives making up a total of 85% by weight of the liquid crystal material with $\Delta\epsilon\leq1$, 10% by weight of a liquid crystal chemical compound having a 4-cyano-3,5-difluorophenyl group, and 5% by weight of a liquid crystal compound having a 3,4,5-trifluorophenyl group, which are all mixed together to form the liquid crystal mixture (VI). The physical parameters of this liquid crystal mixture were found to be: $\gamma1=45$ mPa·s, $\Delta n=0.094$, and $\Delta\epsilon=4.5$. Therefore, in the liquid crystal display device according to the present preferred embodiment of the invention, $\gamma1/\Delta n^2$ was $5.1\times10^3$ mPa·s, and d·$\Delta n$ was 0.291 μm. In addition, it was found that $\Delta n/\sqrt{\Delta\epsilon}=4.4\times10^{-2}\leq5.5\times10^{-2}$.

Further, in the liquid crystal display device according to the present preferred embodiment of the invention, the liquid crystal response time was 5 msec when the voltage was changed from that for minimum brightness to that for maximum brightness. Thus, this response time was smaller than the one-frame period in the present preferred embodiment, which is 1/60=16.7 msec. In addition, when the response time of gray levels was measured, even the worst response time was 11 msec, which is a response time less than one-frame period.

The contrast ratios of the liquid crystal display device using pillar shaped spacers and the liquid crystal display device using spherical spacers were 350:1 and 135:1, respectively. When the liquid crystal alignment around the spacers in a liquid crystal display device using spherical spacers was observed under a microscope, it was almost the same as that shown in FIG. 12(a).

Further, it was possible to apply a voltage to the liquid crystals using the driving IC that was sufficient to give the maximum brightness.

According to the present invention, in a liquid crystal display device using in-plane switching mode of the normally closed type, it is possible to achieve fast response of less than one-frame period by adjusting the liquid crystal mixtures, thereby making the content 40% or more weight percentage but 100% or less weight percentage of a constituent component with a dielectric anisotropy of $\Delta\epsilon\leq1$. In addition, it is also possible to achieve high response speed of less than one-frame period by adjusting the liquid crystal mixtures, thereby adjusting the rotational viscosity yl and the birefringence $\Delta n$ so that the following condition is satisfied: $1\times10^3$ mPa·s$\leq\gamma1/\Delta n^2\leq1.2\times10^4$ mPa·s.

In addition, it is possible to achieve a high contrast ratio by placing the spacers in a non-displaying area.

What is claimed is:

1. In a liquid crystal display device having a pair of substrates whose spacing is determined by spacers, a liquid crystal layer filled in the space between said pair of substrates, a set of electrodes formed on the surface of one of the substrates of said pair of substrates for applying an electric field to said liquid crystal layer, and a pair of optical polarizers placed so that they enclose said liquid crystal layer and with their axes of polarization almost at right angles to each other;

a liquid crystal display device having the characteristic that, said spacers are placed in a non-displaying region, said liquid crystal layer contains 40% or more weight percentage or 100% or less weight percentage of a constituent component with a dielectric anisotropy of $\Delta\epsilon\leq1$, the directions of controlled orientation of liquid crystal molecules at the two surfaces between said liquid crystal layer and said pair of substrates are almost parallel, and the axis of polarization of one of the polarizers is almost aligned with the direction of controlled orientation of liquid crystal molecules at said surfaces.

2. In a liquid crystal display device having a pair of substrates whose spacing is determined by spacers, a liquid crystal layer filled in the space between said pair of substrates, a set of electrodes formed on the surface of one of the substrates of said pair of substrates for applying an electric field to said liquid crystal layer, and a pair of optical polarizers placed so that they enclose said liquid crystal layer and with their axes of polarization almost at right angles to each other;

a liquid crystal display device having the characteristic that the rotational viscosity $\gamma1$ and the birefringence $\Delta n$ of said liquid crystal layer satisfy the condition of $1\times10^3$ mPa·s$\leq\gamma1/\Delta n^2\leq1.2\times10^4$ mPa·s.

3. A liquid crystal display device according to claim 2 above with the characteristic that the rotational viscosity $\gamma1$ and the birefringence $\Delta n$ of said liquid crystal layer satisfy the condition of $1\times10^3$ mPa·s$\leq\gamma1/\Delta n^2\leq6\times10^3$ mPa·s.

4. A liquid crystal display device according to claim 1 above with the characteristic that the rotational viscosity $\gamma1$ and the birefringence $\Delta n$ of said liquid crystal layer satisfy the condition of $1\times10^3$ mPa·s$\leq\gamma1/\Delta n^2\leq1.2\times10^4$ mPa·s.

5. A liquid crystal display device according to claim 4 above with the characteristic that the rotational viscosity $\gamma1$ and the birefringence Δn of said liquid crystal layer satisfy the condition of $1\times10^3$ mPa·s$\leq\gamma1/\Delta n^2\leq6\times10^3$ mPa·s.

6. A liquid crystal display device according to claim 5 above with the characteristic that said set of electrodes comprises pixel electrodes, common electrodes, and active elements, and at least either one of said pixel electrodes and said common electrodes are formed as transparent electrodes.

7. A liquid crystal display device according to claim 1 above with the characteristic that the birefringence Δn and thickness d of said liquid crystal layer satisfy the condition of 0.2 μm<d·Δn<0.4 μm.

8. A liquid crystal display device according to claim 1 above with the characteristic that at least one of the constituent components with a dielectric anisotropy of $\Delta\in\leq1$ contained in said liquid crystal layer is a chemical compound having two ring structures in the molecule, and said ring structure is a benzene ring or a cyclohexane ring.

9. A liquid crystal display device according to claim 1 above with the characteristic that at least one of the constituent components with a dielectric anisotropy of $\Delta\in\leq1$ contained in said liquid crystal layer is a chemical compound having only one ring structure in the molecule, and said ring structure is either a benzene ring or a cyclohexane ring.

10. A liquid crystal display device according to claim 9 above with the characteristic that said chemical compound present in said liquid crystal layer and having only one ring structure in the molecule has a structure represented by the following chemical formula:

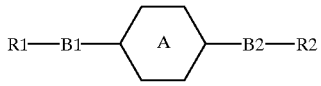

(In this formula, A denotes a 1,4-cyclohexylane ring or a 1,4-phenylane ring. B1 and B2 are groups selected from the group comprising —COO—, —OOC—, —OCO—, —CX2-, =CX—, —CX=, and —O—, and X is either a hydrogen atom or a halogen atom, R1 and R2 are alkyl groups with a carbon number in the range 1~8 and can be substituted by halogen atoms, or can contain double bonds in the carbon chain.).

11. A liquid crystal display device according to claim 10 above with the characteristic that said chemical compound having only one ring structure in the molecule has a structure in which ring A is 1,4-cyclohexylane, B1 and B2 are groups selected from the group comprising —CX2-, CX=, and —O—, R1 and R2 are alkyl groups with a carbon number of 2, 4, 6, or 8 and can be substituted by halogen atoms.

12. A liquid crystal display device according to claim 11 above with the characteristic that R1 and R2 in said 1,4-cyclohexylane derivatives are alkyl chains with a carbon number of 4, 6, or 8 that can be substituted by halogen atoms, and with a double bond present between the $n^{th}$ carbon and the $(n+1)^{th}$ carbon atoms (n=2, 4, 6).

13. A liquid crystal display device according to claim 12 above with the characteristic that said chemical compound having only one ring structure in the molecule is one in which ring A is 1,4-phenylane, B1 and B2 are groups selected from the group comprising —CX2-, and —O—, R1 and R2 are alkyl groups with a carbon number of 2, 4, 6, or 8 and can be substituted by halogen atoms.

14. A liquid crystal display device according to claim 13 above with the characteristic that R1 and R2 in said 1,4-phenylane derivatives are alkyl chains with a carbon number of 4, 6, or 8 that can be substituted by halogen atoms, and with a double bond present between the $n^{th}$ carbon and the $(n+1)^{th}$ carbon atoms (n=2, 4, 6).

15. A liquid crystal display device according to claim 10 above with the characteristic that said chemical compound having only one ring structure in the molecule is one in which B1 is —OOC— and B2 is —OCO—.

16. A liquid crystal display device according to claim 1 above with the characteristic that said liquid crystal layer contains a chemical compound having a structure represented by the following chemical formula in its molecules:

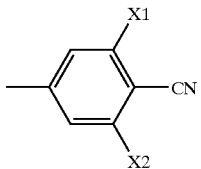

(In this formula, X1 and X2 denote either H or F.).

17. A liquid crystal display device according to claim 16 above with the characteristic that said liquid crystal layer contains an medium polar component whose polarization characteristics are in between those of the low polarization component with, a, dielectric anisotropy of $\Delta\in\leq1$ and of the high polar component represented by the above chemical formula.

18. A liquid crystal display device according to claim 17 above with the characteristic that said medium polar liquid crystal component material is a liquid crystal component material having a structure selected from the set represented by the following chemical formula 3 and chemical formula 4,

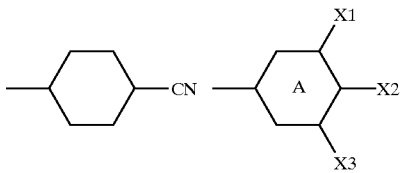

(In these formulae, X1 and X2 denote either H or F. A denotes either a benzene ring or a cyclohexane ring.).

19. A liquid crystal display device according to claim 1 above with the characteristic that said pixel electrodes and common electrodes are formed using opaque materials, and the spacing L between said pixel electrodes and common electrodes, the birefringence Δn and dielectric anisotropy Δ∈ of said liquid crystal layer satisfy the condition of LΔn/√Δ∈$\leq$0.55 μm.

20. A liquid crystal display device according to claim 19 above with the characteristic that the spacing L between said pixel electrodes and common electrodes, the birefringence Δn and dielectric anisotropy Δ∈ of said liquid crystal layer satisfy the condition of LΔn/√Δ∈$\leq$0.4 μm.

21. A liquid crystal display device according to claim 6 above with the characteristic that the birefringence Δn and dielectric anisotropy Δ∈ of said liquid crystal layer satisfy the condition of Δn/√Δ∈$\leq$5.5×10$^{-2}$.

22. A liquid crystal display device according to claim 6 above with the characteristic that said liquid crystal layer has a dielectric anisotropy of 7 or more and a twist elastic constant $K_{22}$ of 5.5 pN or less.

23. A liquid crystal display device according to claim 1, wherein the dielectric anisotropy of Δ∈ is one of a positive anisotropy and a negative anisotropy.

24. A liquid crystal display device according to claim 23, wherein the dielectric anisotropy of Δ∈ is a positive anisotropy.

25. A liquid crystal display device according to claim 23, wherein the dielectric anisotropy of Δ∈ is a negative anisotropy.

* * * * *